(12) United States Patent
Endoh et al.

(10) Patent No.: US 9,245,178 B2
(45) Date of Patent: Jan. 26, 2016

(54) BIOLOGICAL INFORMATION OBTAINING APPARATUS AND BIOLOGICAL INFORMATION COLLATING APPARATUS

(71) Applicant: FUJITSU LIMITED, Kawasaki (JP)

(72) Inventors: Toshio Endoh, Yokohama (JP); Takashi Shinzaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 14/025,393

(22) Filed: Sep. 12, 2013

(65) Prior Publication Data

US 2014/0016834 A1   Jan. 16, 2014

Related U.S. Application Data

(63) Continuation of application No. PCT/JP2011/056454, filed on Mar. 17, 2011.

(51) Int. Cl.
*G06K 9/00* (2006.01)
*G06F 21/32* (2013.01)
*G06F 21/62* (2013.01)

(52) U.S. Cl.
CPC ............ *G06K 9/00362* (2013.01); *G06F 21/32* (2013.01); *G06F 21/6245* (2013.01); *G06K 9/00087* (2013.01);
(Continued)

(58) Field of Classification Search
None
See application file for complete search history.

(56) References Cited

U.S. PATENT DOCUMENTS 7,200,753 B1 * 4/2007 Shinzaki et al. ............... 713/182
7,445,160 B2 * 11/2008 Ruckenstein et al. ......... 235/494
7,840,808 B2 * 11/2010 Takamizawa et al. ........ 713/170

(Continued)

FOREIGN PATENT DOCUMENTS

JP   2000-11176    1/2000
JP   2006-154033   6/2006

(Continued)

OTHER PUBLICATIONS

Ari Juels et al., "A Fuzzy Vault Scheme," Proceedings of IEEE International Symposium on Information Theory, Jun. 30-Jul. 5, 2002, p. 408.

(Continued)

*Primary Examiner* — Bhavesh Mehta
*Assistant Examiner* — Sean Conner
(74) *Attorney, Agent, or Firm* — Staas & Halsey LLP

(57) ABSTRACT

An obtaining unit of a biological information obtaining apparatus obtains biological information for authentication, and an extracting unit extracts first feature information from biological information for authentication. A generating unit of a biological information collating apparatus generates encrypted position correction information, and encrypted position correction information is transmitted to the biological information obtaining apparatus. A correcting unit decrypts encrypted position correction information to obtain position correction information, and by correcting first feature information, performs alignment between first feature information and second feature information extracted from biological information for registration. A transforming unit transforms corrected first feature information, and transmits transformed first feature information to the biological information collating apparatus. A collating unit collates transformed first feature information and transformed second feature information stored in a storing unit, and transmits a collation result to biological information obtaining apparatus.

10 Claims, 30 Drawing Sheets

(52) U.S. Cl.
CPC .............. *G06K 2009/00932* (2013.01); *G06K 2009/00953* (2013.01); *G07C 2209/12* (2013.01)

(56) References Cited

U.S. PATENT DOCUMENTS

| | | | |
|---|---|---|---|
| 8,412,940 B2 | 4/2013 | Takahashi et al. | |
| 8,417,960 B2* | 4/2013 | Takahashi et al. ............ | 713/186 |
| 2005/0147282 A1* | 7/2005 | Fujii .................. | G06K 9/00087 382/124 |
| 2006/0104484 A1* | 5/2006 | Bolle et al. ..................... | 382/115 |
| 2006/0291701 A1* | 12/2006 | Tanaka ......................... | 382/115 |
| 2007/0286465 A1* | 12/2007 | Takahashi et al. ............ | 382/125 |
| 2009/0022374 A1* | 1/2009 | Boult ............................ | 382/119 |
| 2009/0274344 A1* | 11/2009 | Bringer et al. ................ | 382/115 |
| 2010/0202671 A1* | 8/2010 | Chen et al. .................... | 382/125 |
| 2011/0001607 A1* | 1/2011 | Kamakura .................... | 340/5.82 |
| 2011/0013814 A1* | 1/2011 | Ivanov et al. ................. | 382/124 |
| 2011/0026781 A1* | 2/2011 | Osadchy et al. .............. | 382/118 |
| 2011/0185176 A1* | 7/2011 | Takahashi et al. ............ | 713/168 |
| 2011/0200234 A1* | 8/2011 | Takahashi et al. ............ | 382/115 |

FOREIGN PATENT DOCUMENTS

| | | |
|---|---|---|
| JP | 2007-293807 | 11/2007 |
| JP | 2007-328502 | 12/2007 |
| JP | 2008-129743 | 6/2008 |
| JP | 2010-108365 | 5/2010 |
| JP | 2011-13912 | 1/2011 |

OTHER PUBLICATIONS

International Search Report of PCT/JP2011/056454 mailed on May 17, 2011.

Sakai, Tomoya, "Compressed Pattern Recognition," *IEICE (The Institute of Electronics, Information, and Communications Engineers) Technical Report*, vol. 109, No. 344, Dec. 10, 2009, pp. 43-48.

Office Action mailed Sep. 9, 2014 for corresponding Japanese Patent Application No. 2013-504489.

PCT International Preliminary Report on Patentability issued Sep. 17, 2013 in corresponding International Application No. PCT/JP2011/056454.

Extended European Search Report dated Jul. 17, 2014 in corresponding European Patent Application No. 11860845.4.

Rathgeb et al., "A survey on biometric cryptosystems and cancelable biometrics", EURASIP Journal on Information Security, 2011, pp. 1-25.

Isobe et al., "Survey on Privacy Protection Biometric Authentication Technologies", International Telecommunication Union, Apr. 2006, pp. 1-12.

* cited by examiner

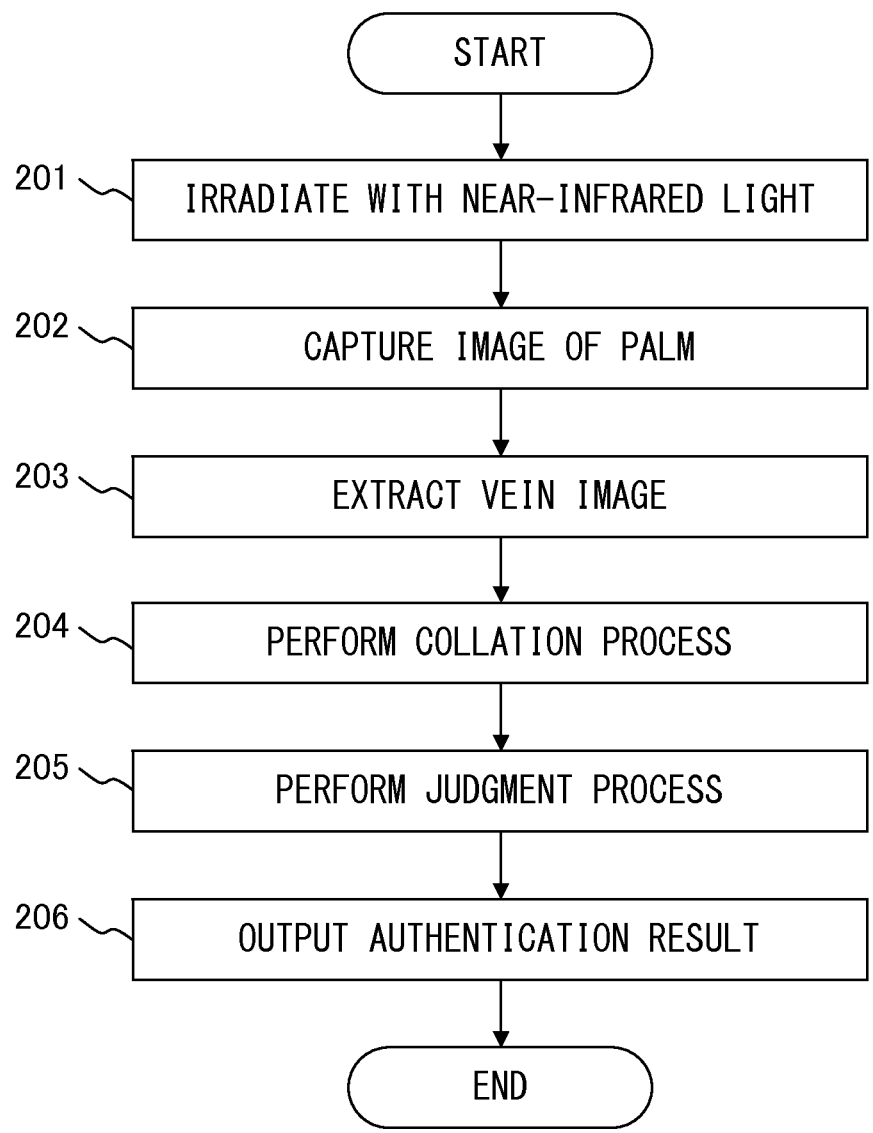
F I G. 2

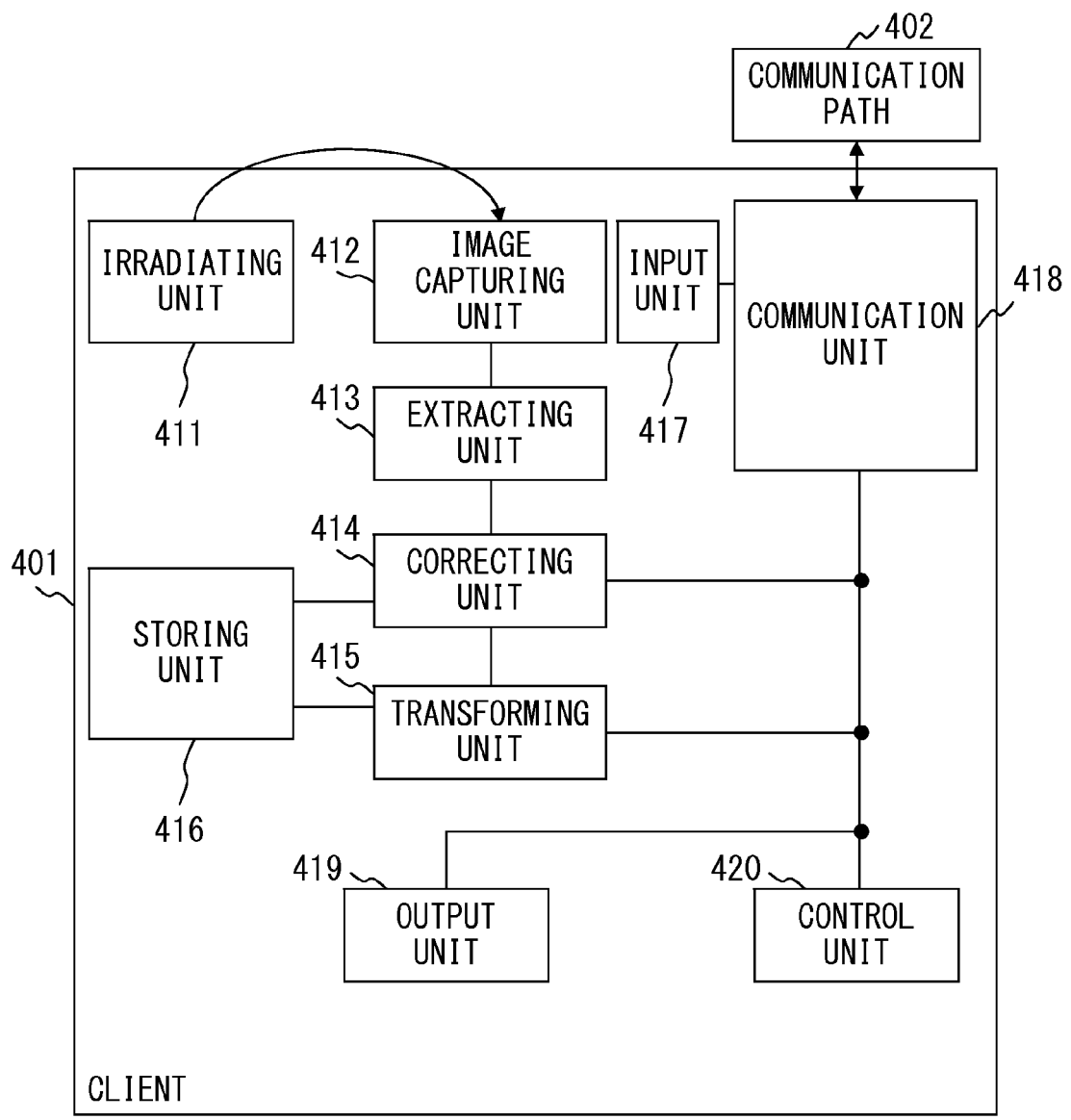
F I G. 4

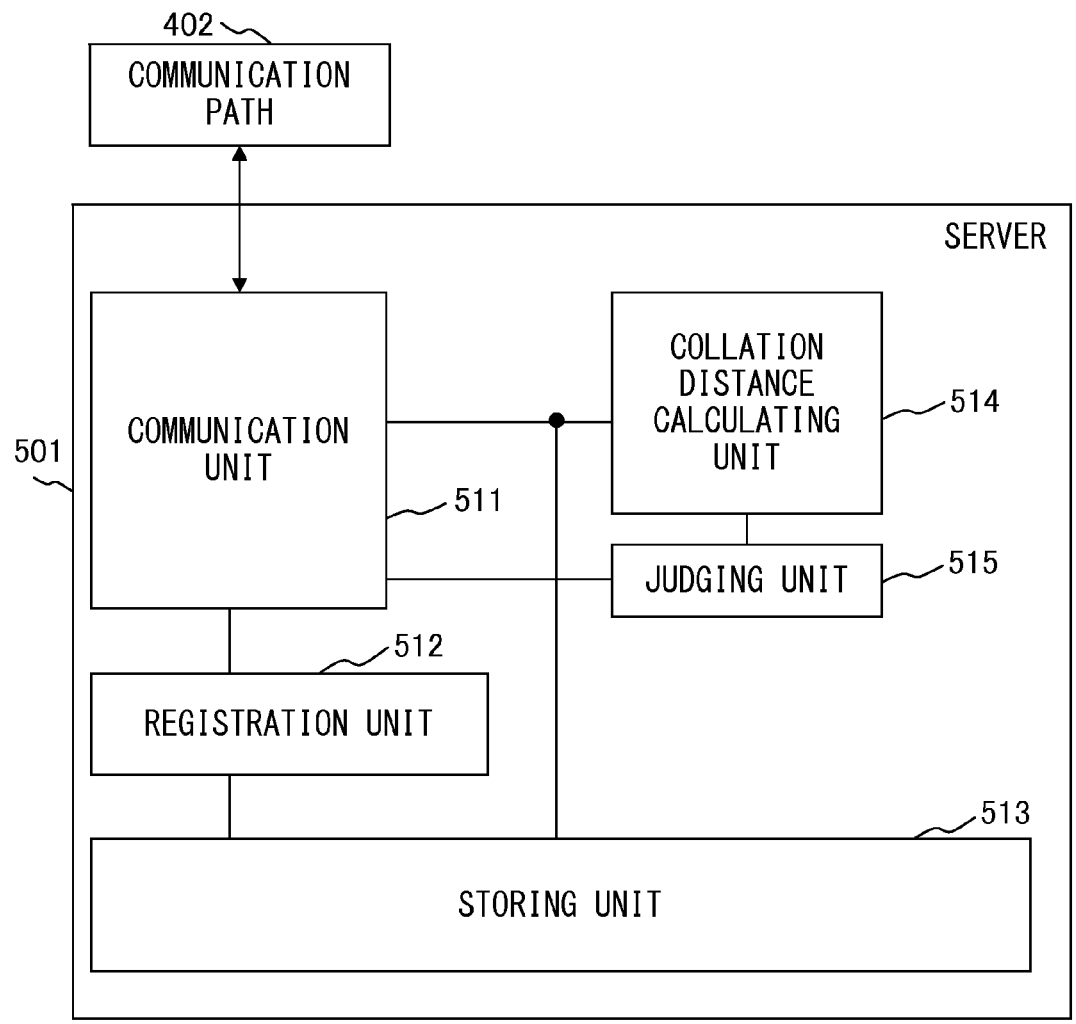
F I G. 5

| FEATURE POINT NUMBER | COORDINATE VALUE |
|---|---|
| 1 | (1, 1) |
| 2 | (2, 3) |
| 3 | (3, 3) |

FIG. 10

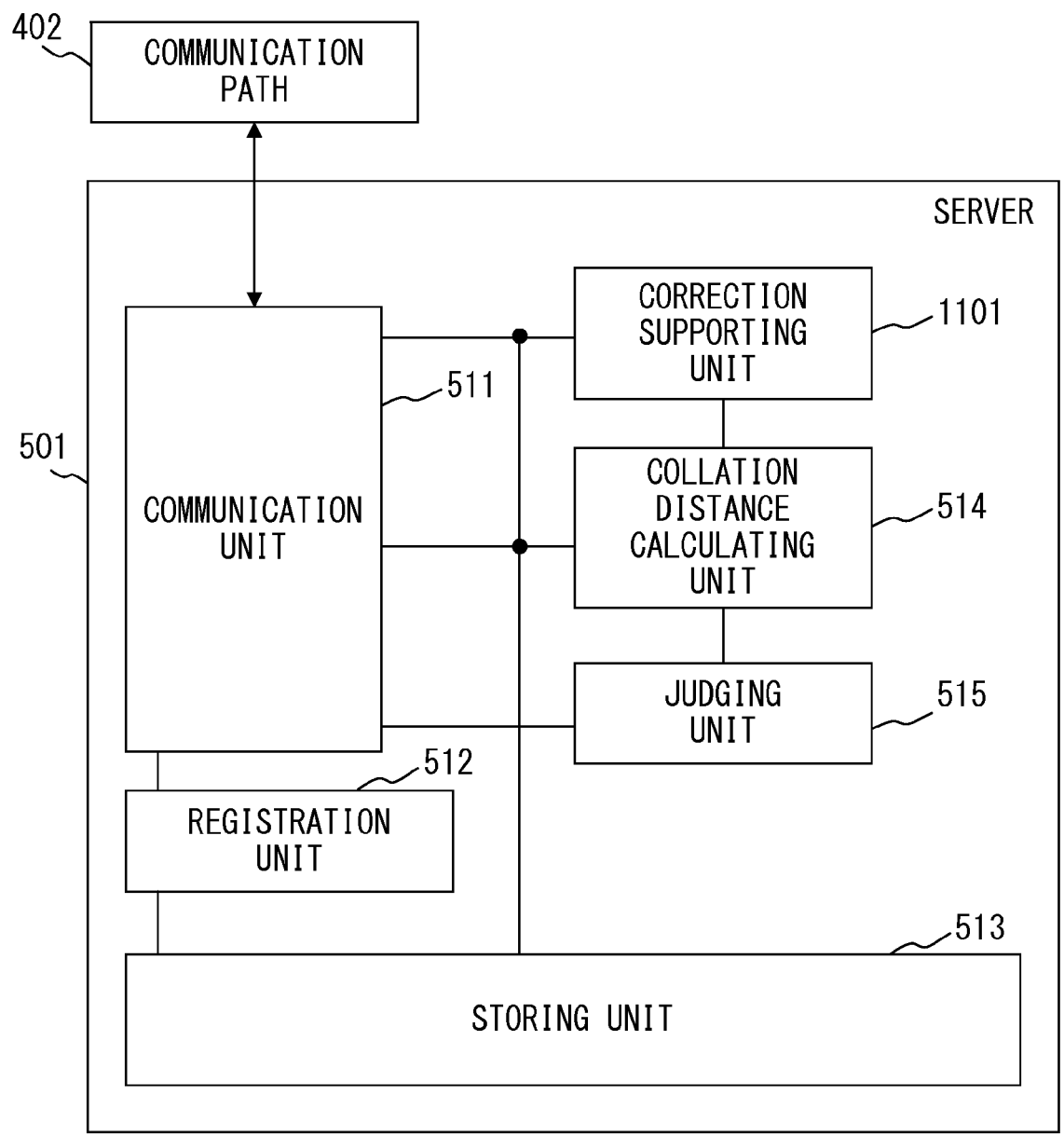
F I G. 1 1

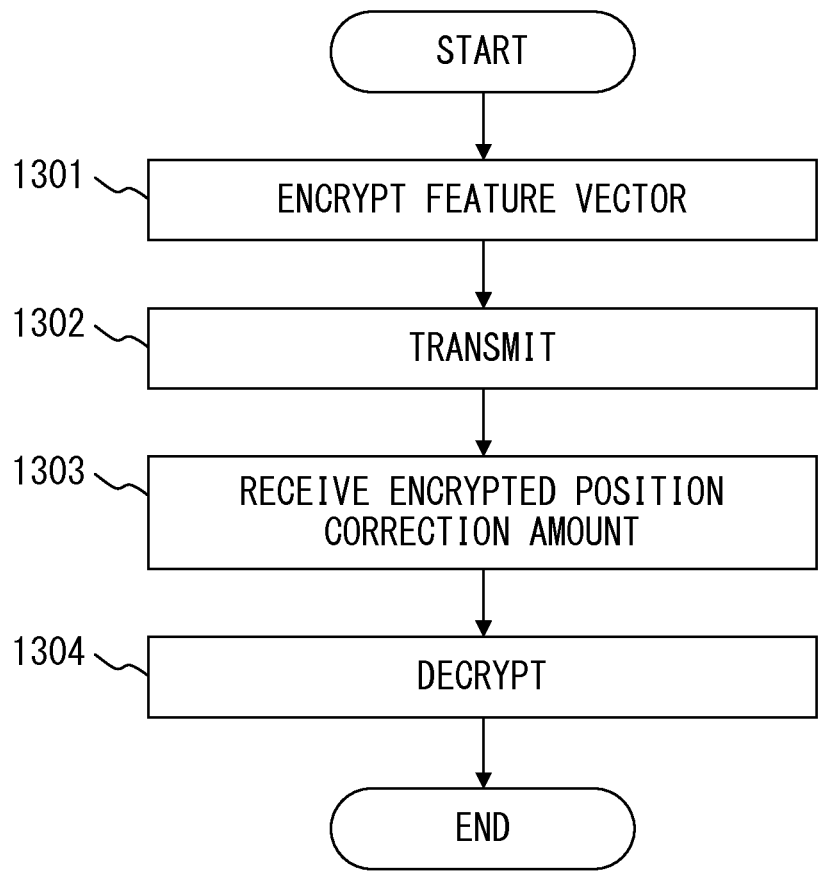
F I G. 13

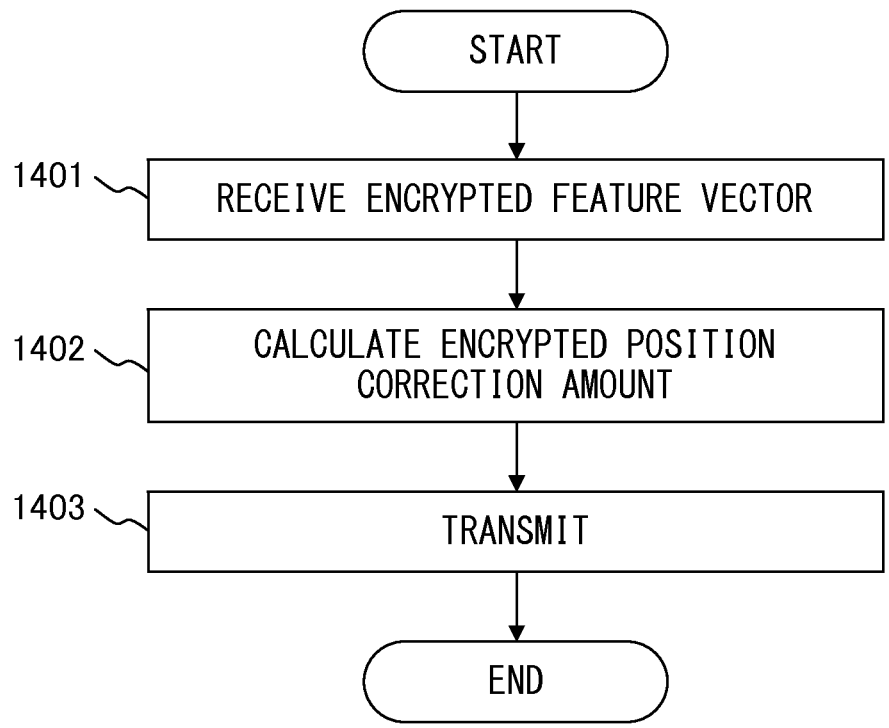
F I G. 1 4

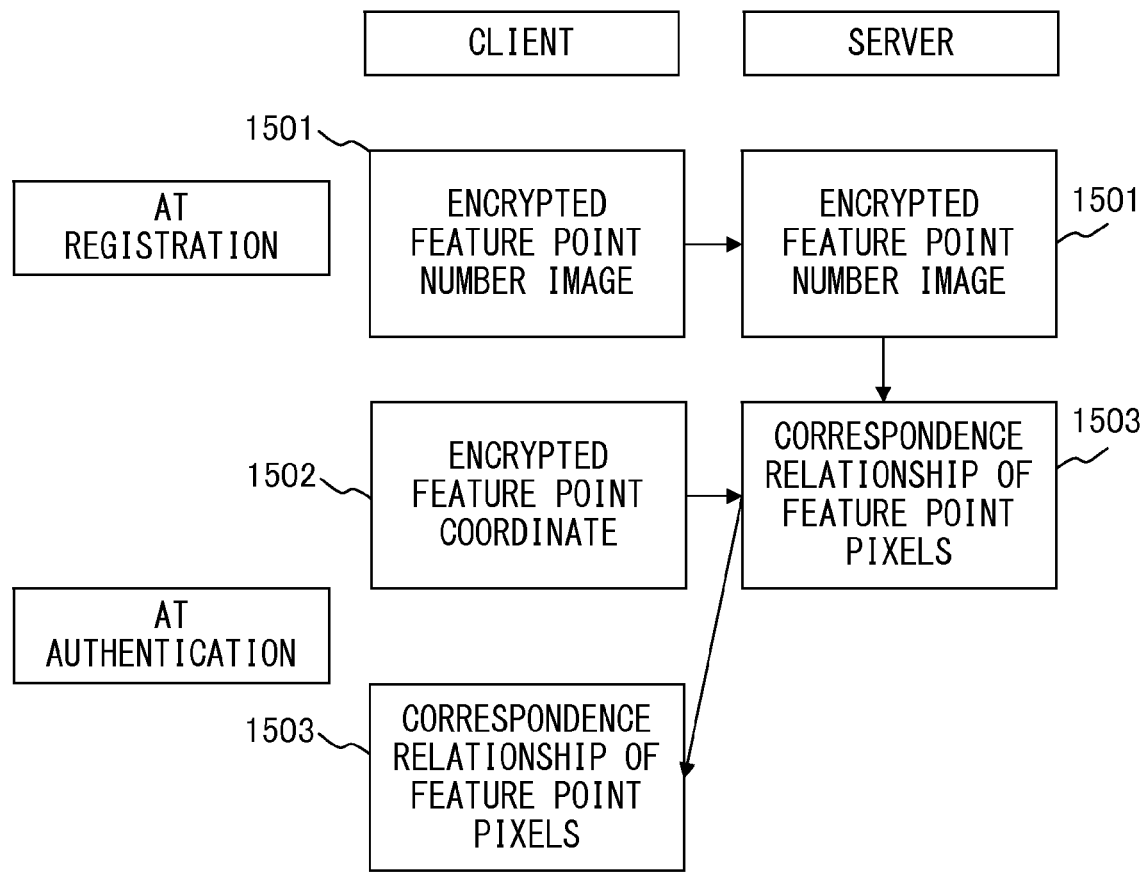
F I G. 1 5

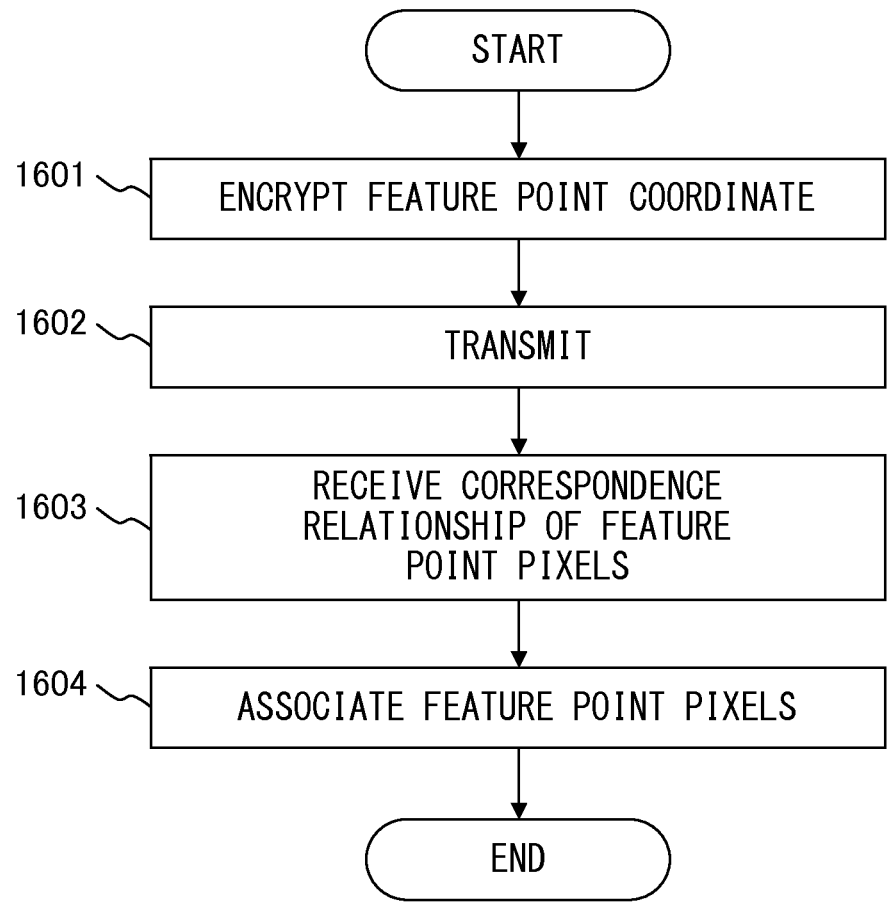
F I G. 16

| P1 : 1 | P2 : 1 | P3 : 1 |
| --- | --- | --- |
| P4 : 1 | P5 : 2 | P6 : 3 |
| P7 : 2 | P8 : 2 | P9 : 3 |

FIG. 18

| P1 | P2 | P3 | P4 | P5 | P6 | P7 | P8 | P9 |
|----|----|----|----|----|----|----|----|----|
| P9 | P1 | P5 | P2 | P6 | P3 | P8 | P4 | P7 |

F I G. 1 9

| 3 | 1 | 2 |
|---|---|---|
| 1 | 3 | 1 |
| 2 | 1 | 2 |

FIG. 20

| FEATURE POINT NUMBER | COORDINATE VALUE |
|---|---|
| 1 | (2, 1) |
| 2 | (1, 3) |
| 3 | (1, 1) |

F I G. 2 1

| COLLATION DATA FEATURE POINT NUMBER | REGISTERED DATA FEATURE POINT NUMBER |
|---|---|
| 1 | 1 |
| 2 | 2 |
| 3 | 3 |

FIG. 22

| FEATURE POINT NUMBER | COORDINATE VALUE |
|---|---|
| 1 | (1, 2) |
| 2 | (2, 2) |
| 3 | (3, 2) |

F I G. 2 3

| FEATURE POINT NUMBER | COORDINATE VALUE |
|---|---|
| 1 | (2, 3) |
| 2 | (3, 1) |
| 3 | (2, 2) |

FIG. 24

| P1 : 0 | P2 : 1 | P3 : 1 |
| --- | --- | --- |
| P4 : 1 | P5 : 1 | P6 : 1 |
| P7 : 1 | P8 : 0 | P9 : 0 |

FIG. 25

| 0 | 0 | 1 |
|---|---|---|
| 1 | 1 | 1 |
| 0 | 1 | 1 |

FIG. 26

| USER ID | TRANSFORMED VEIN IMAGE |
|---------|------------------------|
| 0001 | 0, 0, 1, 1, 1, 1, 0, 1, 1, ... |
| 0002 | 0, 0, 0, 1, 1, 1, 1, 0, 0, ... |
| ⋮ | ⋮ |

F I G. 2 7

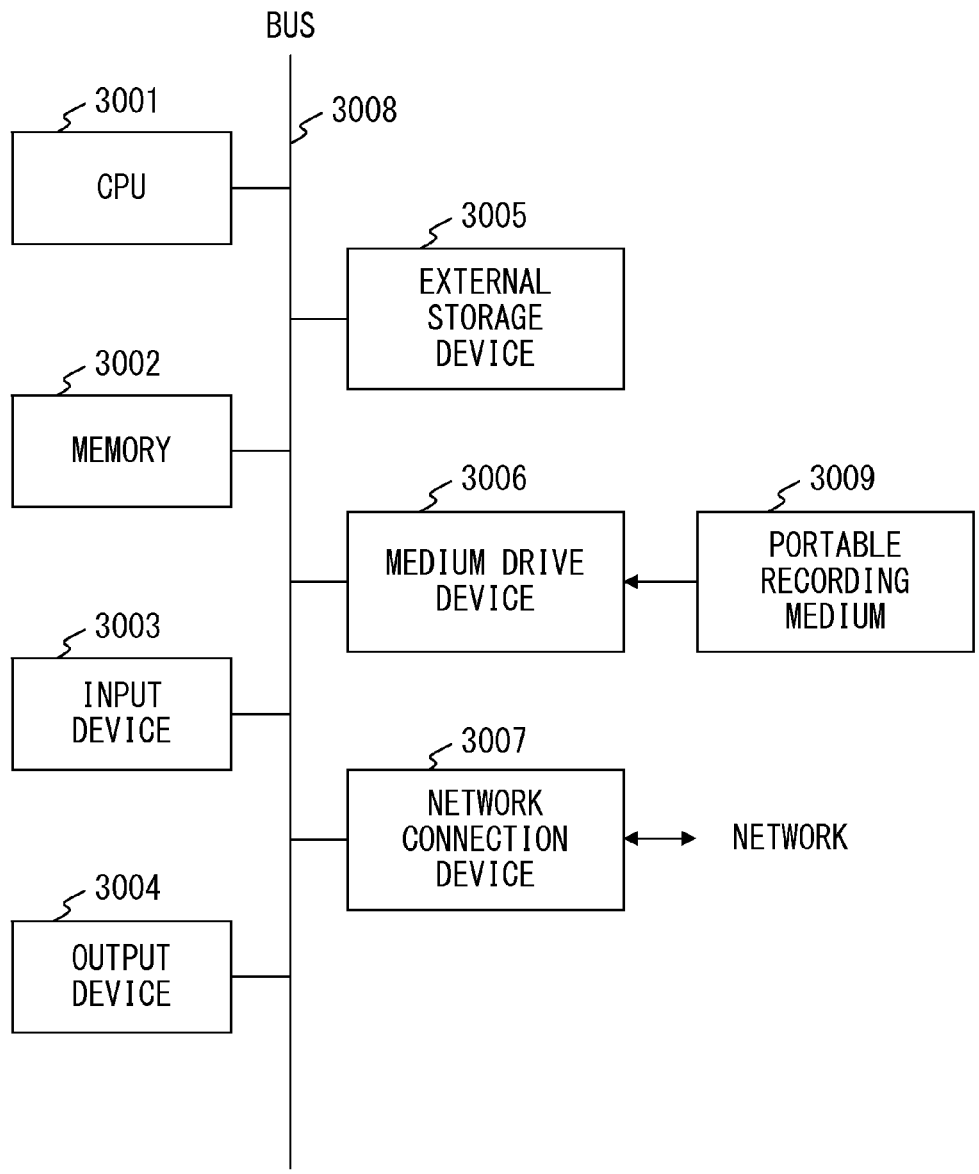
F I G. 3 0

BIOLOGICAL INFORMATION OBTAINING APPARATUS AND BIOLOGICAL INFORMATION COLLATING APPARATUS

CROSS-REFERENCE TO RELATED APPLICATION

This application is a continuation application of International Application PCT/JP2011/056454 filed on Mar. 17, 2011 and designated the U.S., the entire contents of which are incorporated herein by reference.

FIELD

The present invention relates to a biological information obtaining apparatus, biological information collating apparatus and a program.

BACKGROUND

Conventionally, as a technique to check identification without human intervention at the time of entering and leaving a facility and the like, personal authentication using biological information such as the fingerprint, face, veins, iris and the like (biometrics authentication) has been used. Unlike personal authentication using a magnetic card or PIN (Personal Identification Number), the personal authentication using biological information has advantages that there is no concern for losing a card, forgetting the PIN or fraudulent use of the card and PIN.

Here, with an example of a case using veins as biological information, an explanation about the personal authentication technique is made. FIG. 1 illustrates a configuration example of a personal authentication apparatus, and FIG. 2 is a flowchart illustrating an example of an authentication process that the personal authentication apparatus in FIG. 1 performs. The personal authentication apparatus in FIG. 1 includes an irradiating unit 101, an image capturing unit 102, an extracting unit 103, a storing unit 104, a collating unit 105, and a judging unit 106.

First, the irradiation unit 101 irradiates a part of the human body such as a palm 111 where it is easy to capture veins with near-infrared light (step 201), and the image capturing unit 102 obtains an image by capturing image of the intensity distribution of the reflected or transmitted light (step 202).

Next, the extracting unit 104 performs a feature extraction process to extract the vein image from the image (step 203). The storing unit 104 stores the vein image of each individual registered in advance. Feature information such as the vein image and the like obtained by image capturing at the time of authentication is called collation data, and the registered feature information is called registered data or registered template.

The collating unit 105 collates the collation data and the registered data (step 204), and the judging unit 106 judges whether or not they match (step 205), and outputs an authentication result 112 (step 206). When a judgment is made that the collation data and registered data match, a positive authentication result indicating the registered person is output, and when a judgment is made that the collation data and the registered data do not match, a negative authentication result is output.

Since biological information change to some extent even for the same person, it is desirable that variation to some extent is allowed in the matching judgment of the vein images. For example, the similarity between the collation data and the registered data is expressed by a measure called a collation distance, and when the collation distance is smaller than a given threshold, the judgment is made that the two match.

The collation data is, usually, stores in a storage apparatus such as the Integrated Circuit (IC) card owned by the user, a database of the server and the like, and the collation process is executed in a computer close to the user, a server under central control and the like. The server-type authentication in which the storage of registered data and the collation process are performed on a server has advantages of effectiveness by the centralization of computer resources and ease of management of registered data, enabling shared use among a plurality of places.

On the other hand, a problem of the server-type authentication is the risk that, due to a malicious intention or lack of care of the administrator and the like, biological information (registered data and collation data) may be leaked and used fraudulently. Unlike the PIN, it is impossible to change biological information itself of each individual, the influence is significant when leakage happens.

Therefore, to protect biological information, the encryption technique has been used conventionally. A method to extract feature information after performing a prescribed transformation process for biological information, and to collate the feature information and registered information has also been known. At this time, to prevent degradation of the authentication accuracy, a method to limit the transformation process to a line-symmetric transformation and rotation, and a method to limit the collation process to a special one have also been proposed.

In addition, to protect biological information, a method to quantize biological information as a discrete value and to apply the error correction code technique has also been known, and a secret calculation technique to perform an arbitrary calculation while keeping input data encrypted has also been known.

Furthermore, a method to perform an independent transformation process for each feature point extracted from fingerprint information, and a method to detect the position correction amount of a feature amount for authentication against a registered feature amount and to correct the feature amount for authentication have also been known.

Patent Document 1: Japanese Laid-open Patent Publication No. 2000-11176
Patent Document 2: Japanese Laid-open Patent Publication No. 2008-129743
Patent Document 3: Japanese Laid-open Patent Publication No. 2007-293807
Patent Document 4: Japanese Laid-open Patent Publication No. 2006-154033
Patent Document 5: Japanese Laid-open Patent Publication No. 2007-328502
Patent Document 6: Japanese Laid-open Patent Publication No. 2010-108365
Non-Patent Document
Non-Patent Document 1: A. Juels and M. Sudan, "A Fuzzy Vault Scheme", Proceedings of IEEE International Symposium on Information Theory, 2002, p. 408.

SUMMARY

A biological information obtaining apparatus includes an obtaining unit, an extracting unit, a correcting unit, a transforming unit, and a receiving unit. The obtaining unit obtains biological information for authentication, and the extracting unit extracts first feature information from the biological information for authentication.

The correcting unit decrypts encrypted position correction information to obtain position correction information, and performs position alignment between the first feature information and second feature information extracted from biological information for registration by correcting the first feature information based on obtained position correction information.

The transforming unit transforms corrected first feature information, and transmits transformed first feature information to a biological information collating apparatus that stores transformed second feature information. The receiving unit receives a result of collation of the transformed first feature information with the transformed second feature information from the biological information collating apparatus.

A biological information collating apparatus includes a generating unit, a transmitting unit, a receiving unit, a collating unit, and a storing unit. The generating unit generates encrypted position correction information, and the transmitting unit transmits the encrypted position correction information to a biological information obtaining apparatus.

The receiving unit receives, in order to perform position alignment between first feature information extracted from biological information for authentication and second feature information extracted from biological information for registration, the first feature information transformed after being corrected based on position correction information from the biological information obtaining apparatus. the position correction information is obtained by decrypting encrypted position correction information at the biological information obtaining apparatus.

The storing unit stores transformed second feature information. The collating unit collates the transformed first feature information with the transformed second feature information, and transmits a collation result to the biological information obtaining apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a flowchart of a conventional authentication process;

FIG. 4 is a configuration diagram of a client;

FIG. 5 is a configuration diagram of a first sever;

FIG. 10 is a diagram illustrating a first vein image;

FIG. 11 is a configuration diagram of a second server;

FIG. 13 is a flowchart of a position correction amount calculation process performed by a client at the time of authentication;

FIG. 14 is a flowchart of a position correction amount calculation process performed by a server at the time of authentication;

FIG. 15 is a diagram illustrating a preprocessing;

FIG. 16 is a flowchart of a preprocessing performed by a client at the time of authentication;

FIG. 18 is a diagram illustrating a feature point number image;

FIG. 19 is a diagram illustrating a random permutation;

FIG. 20 is a diagram illustrating an encrypted feature point number image;

FIG. 21 is a diagram illustrating first feature point coordinates;

FIG. 22 is a diagram illustrating correspondence relationship of feature point pixels;

FIG. 23 is a diagram illustrating a second vein image;

FIG. 24 is a diagram illustrating second feature point coordinates;

FIG. 25 is a diagram illustrating an image generated from a vein image;

FIG. 26 is a diagram illustrating a transformed vein image;

FIG. 27 is a diagram illustrating a storage format of a transformed vein image;

FIG. 30 is a configuration diagram of an information processing apparatus.

DESCRIPTION OF EMBODIMENTS

Figure 1:
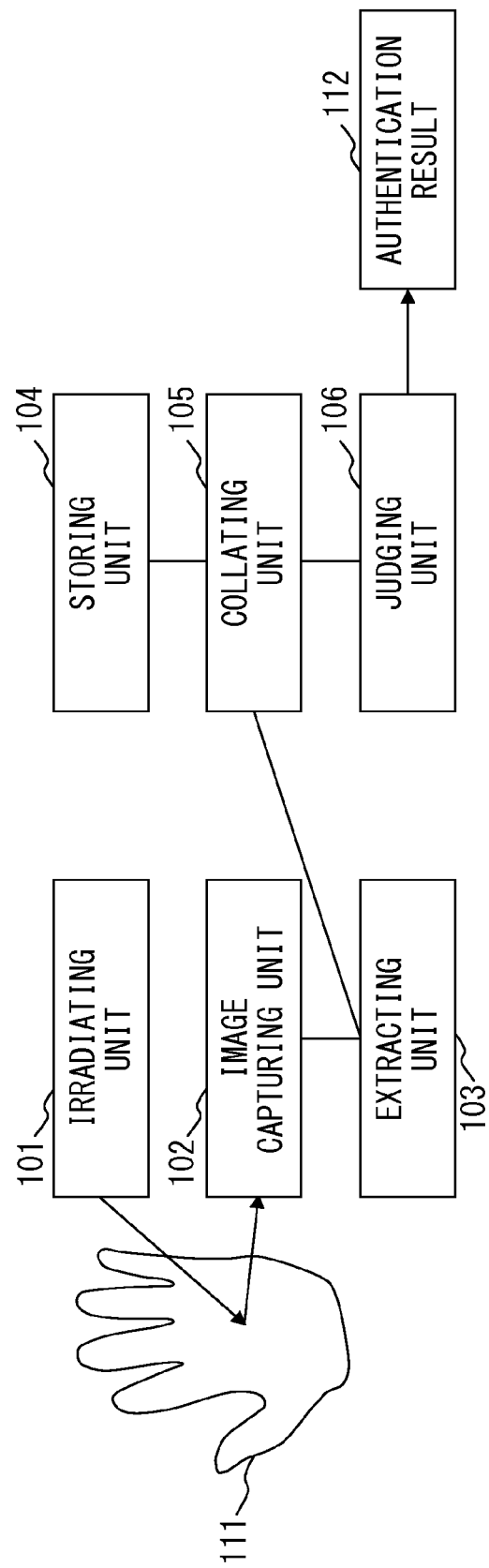
FIG. 1 is a configuration diagram of a conventional personal authentication apparatus.

The conventional personal authentication technique has the following problems.

When biological information is encrypted using the encryption technique, since the biological information needs to be decrypted before the collation process if performed, there remains a risk of leakage of the decrypted biological information. In addition, when a transformation process is performed for biological information, the authentication accuracy generally degrades. With the method to limit the transformation process to the line-symmetric transformation and rotation in order to prevent degradation of the authentication accuracy, since the type of the transformation is limited, there is a risk that the biological information before the transformation is identified. The method to limit the collation process to a special one is unable to be applied to other collation processes.

Meanwhile, with the method of applying the error correction code technique, whether or not collation data and registered data match is to be judged in the error-correctable range. However, it is difficult to completely correct the variation of biological information, and degradation of the authentication accuracy is expected.

The secret calculation technique has a problem of poor practical utility because, excluding the simple calculations for summation, the maximum value and the like, the calculation amount becomes enormous.

With the method of performing an independent transformation process for each feature point, degradation of the authentication accuracy is expected, as it is difficult to associate the feature points of the collation data and registered data. With the method to detect the position correction amount and to correct the feature amount for authentication, there is a risk that biological information may be identified based on the detected position correction amount.

Hereinafter, with reference to the drawings, embodiments are described in detail.

In personal authentication without consideration of protection of biological information, the position alignment process of biological information and the collation distance calculation process are often handled collectively as the collation process. Of these, the position alignment process is a process to correct the position deviation between biological information at the time of registration (biological information for registration) and biological information at the time of authentication (biological information for authentication), and is a necessary process for increasing the accuracy of personal authentication using biological information. In the position alignment process, for example, using coordinate transformation including a parameter of the position correction amount, a value of a parameter that would make biological information for registration and biological information for authentication match as much as possible. As the coordinate transformation, for example, parallel shift or affine transformation are used.

Since it is impossible to identify an individual by the position correction amount or the collation distance alone, there is no need to set each of them as the protection target, but when the combination of the two is exposed, there is a risk that it may become a clue for identifying biological information. Therefore, in the present embodiment, the position alignment process and the collation distance calculation process are separated, performing position alignment before transforming biological information and performing calculation of the collation distance after transformation. In this respect, it differs from a technique performing the collation process in which the two are put together after transformation of biological information.

Furthermore, it is preferable to perform the position alignment process and the collation distance calculation process in separate computer environments (apparatuses). Accordingly, the risk for biological information to be identified may be reduced. In the present embodiment, the computer environment for performing the position alignment may be referred to as a client, and the computer environment for performing the collation distance calculation process may be referred to as a server.

Figure 3:
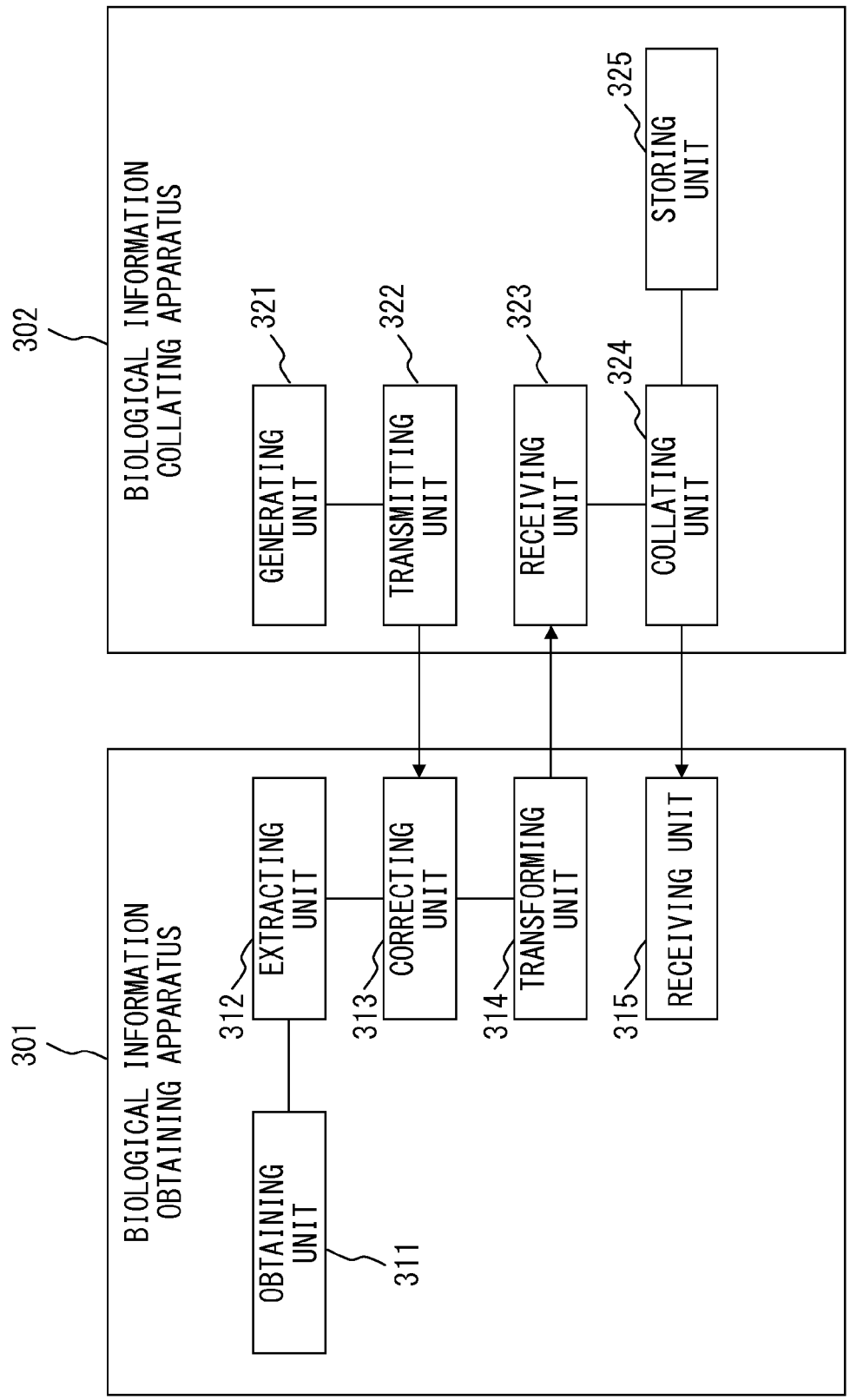
FIG. 3 is a configuration diagram of a first personal authentication system.

FIG. 3 illustrates a configuration example of a personal authentication system of the embodiment. The personal authentication system in FIG. 3 includes a biological information obtaining apparatus 301 and a biological information collating apparatus 302. The biological information obtaining apparatus 301 corresponds to a client, for example, and the biological information collating apparatus 302 corresponds to a server, for example.

The biological information obtaining apparatus 301 includes an obtaining unit 311, an extracting unit 312, a correcting unit 313, a transforming unit 314, and a receiving unit 315. The biological information collating apparatus 302 includes a generating unit 321, a transmitting unit 322, a receiving unit 323, a collating unit 324, and a storing unit 325.

The obtaining unit 311 of the biological information obtaining apparatus 301 obtains biological information for authentication, and the extracting unit 312 extracts first feature information from the biological information for authentication.

The storing unit 325 of the biological information collating apparatus 302 stores transformed second feature information. The second feature information is feature information extracted from biological information for registration. The generating unit 321 generates encrypted position correction information, and the transmitting unit 322 transmits the encrypted position correction information to the biological information obtaining apparatus 301.

The correcting unit 313 of the biological information obtaining apparatus 301 performs position alignment between the first feature information and the second feature information by correcting the first feature information based on the obtained position correction information. The transforming unit 314 transforms the corrected first feature information, and transmits the transformed first feature information to the biological information collating apparatus 302.

The receiving unit 323 of the biological information collating apparatus 302 receives the transformed first feature information from the biological information obtaining apparatus 301. The collating unit 324 collates the transformed first feature information with the transformed second feature information, and transmits the collation result to the biological information obtaining apparatus 301.

The receiving unit 315 of the biological information obtaining apparatus 301 receives the collation result from the biological information collating apparatus 302.

According to the personal authentication described above, degradation of the authentication accuracy may be prevented by performing the position alignment process before transformation, and since the position alignment process and the collation process are performed in separate apparatuses, the risk for biological information to be identified may be reduced.

Hereinafter, using veins as biological information, an example of a personal authentication system performing room-entrance management in combination with an automatic door is explained.

FIG. 4 illustrates a configuration example of a client 401 that perform opening/closing control of an automatic door. The client 401 in FIG. 4 corresponds to the biological information obtaining apparatus 301 in FIG. 3, and includes an irradiating unit 411, an image capturing unit 412, an extracting unit 413, a correcting unit 414, a transforming unit 415, a storing unit 416, an input unit 417, a communication unit 418, an output unit 419, and control unit 420.

The irradiating unit 411 and the image capturing unit 412 correspond to the obtaining unit 311 in FIG. 3, and are placed in the vicinity of the automatic door, for example. The irradiating unit 411 irradiates with near-infrared light, and the image capturing unit 412 captures an image of the user. The extracting unit 413 extracts a vein image from the image, and the correcting unit 414 corrects the vein image at the time of authentication to perform position alignment, and the transforming unit 415 transforms the vein image. The storing unit 416 stores a transformation parameter used for the transformation.

The input unit 417 obtains user identification information (ID) input by the user, and the communication unit 148 communicates with the serves 501 via a communication path 402. The output unit 418 sends a notification of the authentication result to the user, and the control unit 420 performs opening/closing control of the automatic door based on the authentication result.

FIG. 5 illustrates a configuration example of a server 501 that performs the collation process of collation data with registered data. The server 501 in FIG. 5 corresponds to the biological information collation apparatus 302 in FIG. 3, and includes a communication unit 511, a registration unit 512, a storing unit 513, a collation distance calculating unit 514, and a judgment unit 515.

The communication unit 511 communicates with the client 401 via the communication path 402, and the registration unit 512 registers registered data in the storing unit 513. The collation distance calculating unit 514 and the judging unit 515 correspond to the collating unit 324 in FIG. 3. The collation distance calculating unit 514 calculates the collation distance between collation data and registration data, and the judging unit 515 judges whether or not the collation data and the registration data matches, based on the collation distance.

Figure 6:
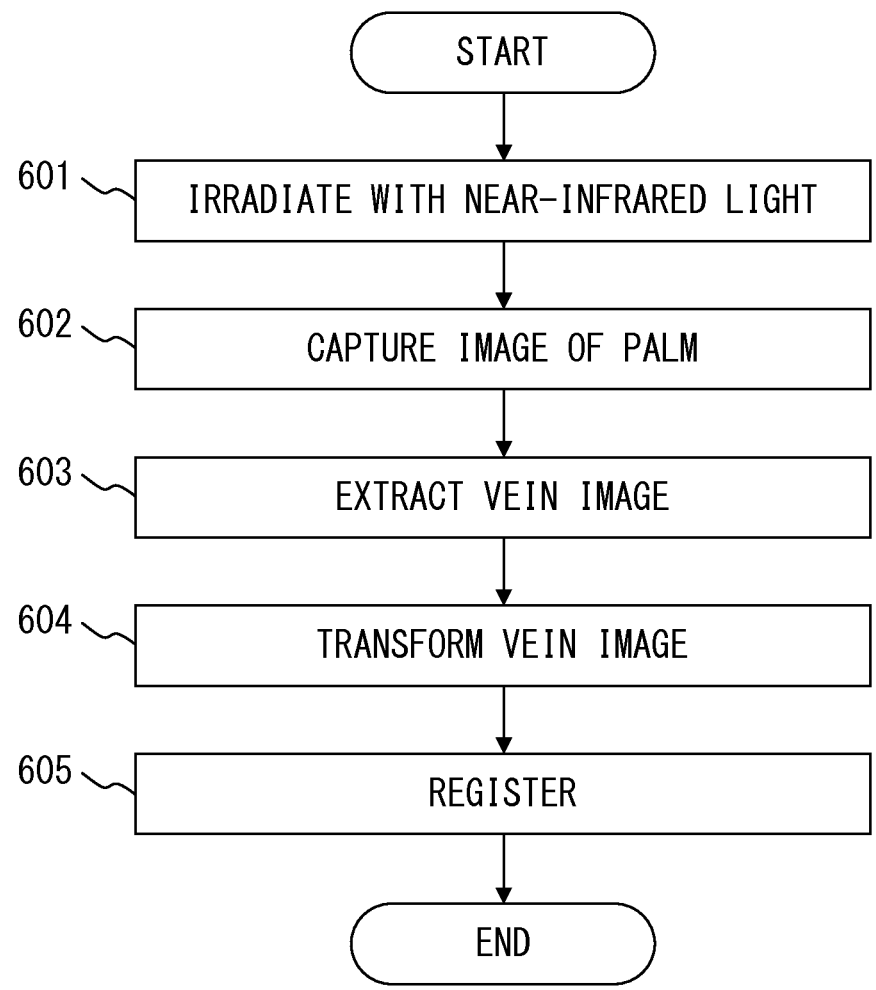
FIG. 6 is a flowchart of a registration process.

FIG. 6 is a flowchart illustrating an example of the registration process performed by the client 401 and the server 501.

A user who wants to register a vein image holds up his/her hand to the irradiating unit 411 and the image capturing unit 412 of the client 401. The irradiating unit 411 irradiates the palm with near-infrared light (step 601), and the image capturing unit 412 obtains an image by capturing an image of the palm (step 602). At this time, the input unit 417 forwards the user ID input by the user to the communication unit 418. The user ID may be read from the user's IC card, and may also be input by an input apparatus such as a keyboard and the like, for example.

Next, the extracting unit 413 performs a feature extraction process and extracts a vein image from the image (step 603). The transforming unit 415 transforms the vein image using a transformation parameter, and together with storing the transformation parameter in the storing unit 416, forwards the transformed vein image to the communication unit 418 (step 604). The communication unit 418 transmits the user ID and the transformed vein image to the server 501 via the communication path 402.

The communication unit 511 of the server 501 receives the user ID and the transformed vein image, and the registration unit 512 stores the user ID and the transformed vein image in the storing unit 513 as registered data.

Figure 7:
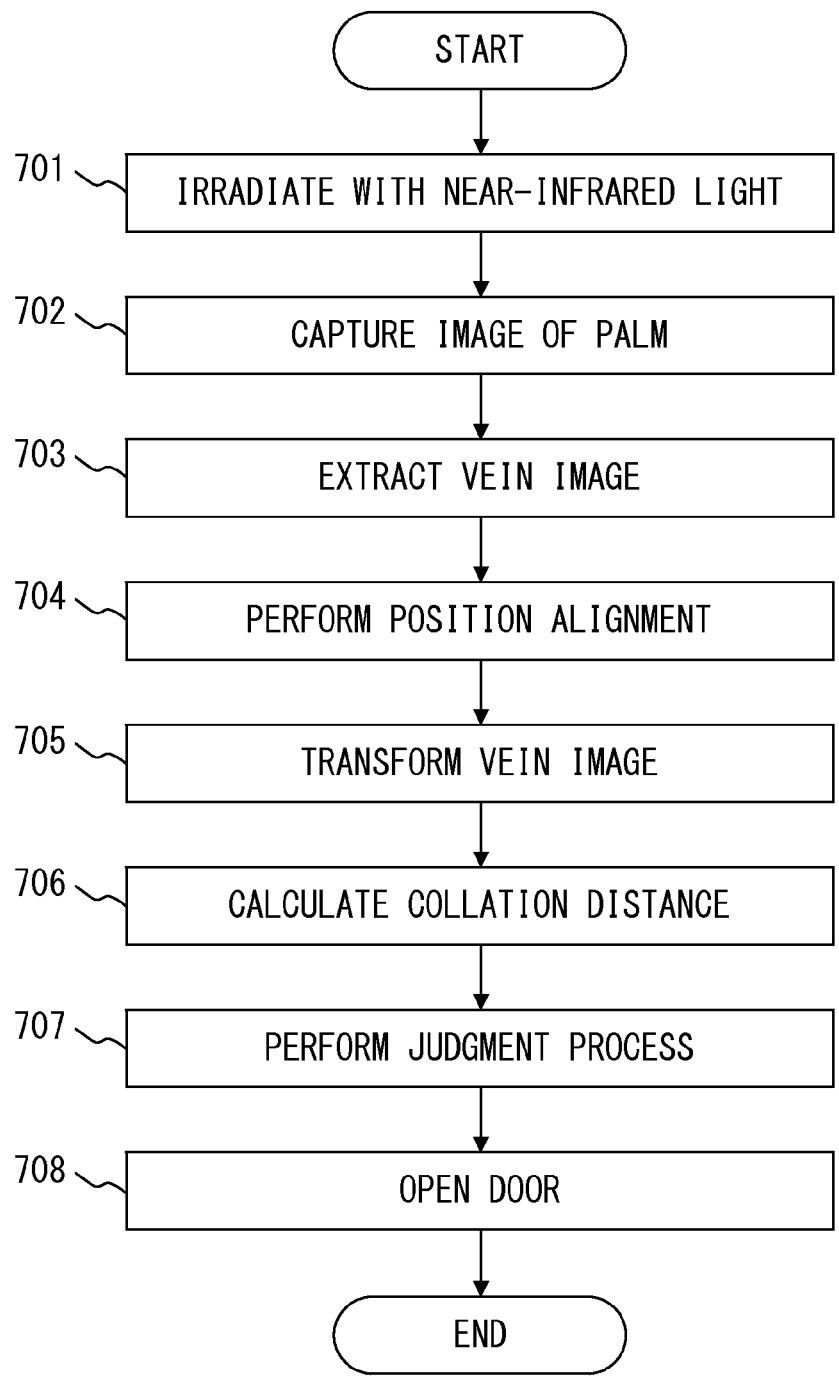
FIG. 7 is a flowchart of an authentication process.

FIG. 7 is a flowchart illustrating an example of the authentication process performed by the client 401 and the server 501.

The user who wants to enter the room holds up his/her hand to the irradiating unit 411 and the image capturing unit 412 of the client 401. The irradiating unit 411 irradiates the palm with near-infrared light (step 701), and the image capturing unit 412 obtains an image by capturing an image of the palm (step 702). At this time, the user may input the user ID into the input unit 417. The input unit 417 forwards the user ID input by the user to the communication unit 418.

Next, the extracting unit 413 performs a feature extraction process and extracts a vein image from the image (step 703), and the correcting unit corrects the vein image to perform position alignment (step S704). The transforming unit 415 transforms the vein image using a transformation parameter stored in the storing unit 416, and, forwards the transformed vein image to the communication unit 418 (step 705). The communication unit 418 transmits the transformed vein image as collation data to the server 501 via the communication path 402. When the user ID has been input, the user ID is also transmitted as collation data.

The communication unit 511 of the server 501 receives the collation data, and the collation distance calculating unit 514 calculates the collation distance with the collation data and registered data stored in the storing unit 513 (step 706). The smaller the collation distance, the larger the similarity between the collation data and the registered data. When the user ID is included in the collation data, the registered data corresponding to the user ID is used, and when no user ID is included, registered data corresponding to the user IDs of all users are used in order.

The judging unit 515 judges whether or not the collation and the registered data match (step 205), and outputs the authentication result (step 707). When the calculated collation distance is smaller than a given threshold, a judgment is made that the two match, and when the collation distance is equal to or above the threshold, a judgment is made that the two do not match. When a judgment is made that the collation data and the registered data match, a positive authentication result indicating the identification of the person or one of the registered people, and when a judgment is made that the collation data and the registered data do not match, a negative authentication result is output. The communication unit 511 transmits the authentication result to the client 401 via the communication path 402.

The control unit 420 of the client 401 performs control to open the automatic door in response to the positive result (step 708). In the case of the negative authentication result, the automatic door is not opened. At this time the output unit 419 makes a notification of the authentication result to the user using a lamp, buzzer and the like. In the case of the positive authentication result, a notification of the room-entrance permission is made to the user, and in the case of the negative authentication result, a notification of the room-entrance non-permission is made to the user.

Next, the configuration, the registration process, and the authentication process of the personal authentication system illustrated in FIG. 4 and FIG. 5 are explained more concretely. In the explanation below, the vein image before transformation by the transforming unit 415 at the time of registration may be referred to as registered data, and the vein image before correction by the correcting unit 414 or transformation by the transforming unit 415 may be referred to as collation data.

As the irradiating unit 411 in FIG. 4, for example, a Light-Emitting Diode (LED) that emits near-infrared light is used. As the image capturing unit 412, for example, a Complementary Metal-Oxide Semiconductor (CMOS) camera or a Charge-Coupled Device (CCD) camera to which a filter for blocking visible light (visible-cut filter) is used.

The extracting unit 417 extracts feature information of the image captured by the image capturing unit 412 as a vein image. As the feature information, for example, the pixel values and positions of a plurality of feature point pixels are used. On the captured image, the background portion is represented as a bright pattern, and veins are represented as dark patterns. Then, for example, using a pixel value such as the luminance value, by regarding the pixel of which pixel value is larger than a threshold as a background pixel and regarding the pixel of which pixel value is equal to or below the threshold as a feature point pixel, a vein image consisting of feature pixels may be extracted.

Figure 8:
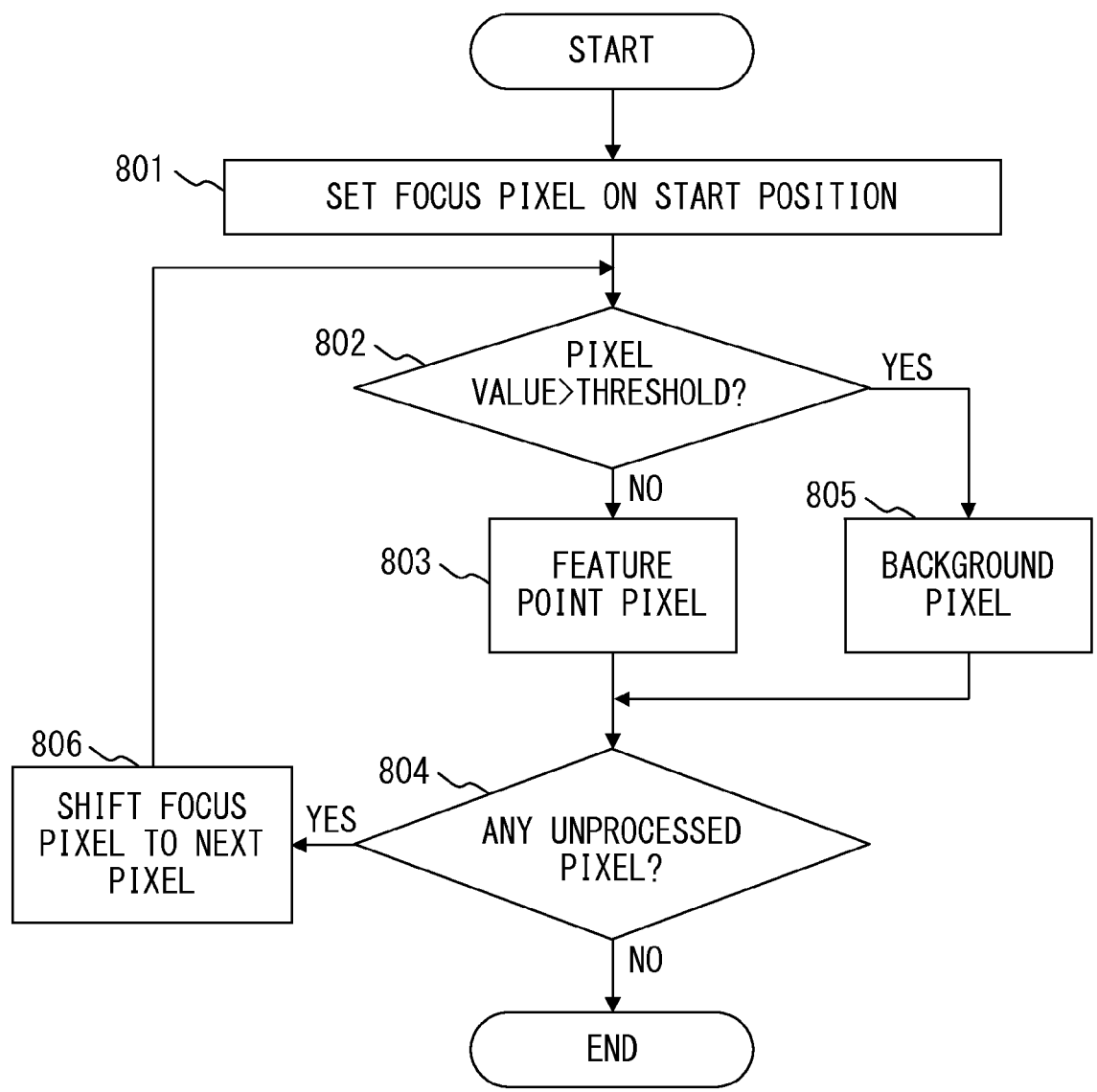
FIG. 8 is a flowchart of a feature extraction process.

FIG. 8 is a flowchart illustrating an example of the feature extraction process as described above. First, the extracting unit 417 sets a focus pixel on the start position on a captured image (step 801). As the start position, for example, the upper-left pixel of the image is used, but the start position is not limited to this position.

Next, the pixel value of the focus pixel is compared with a threshold (step 802), and when the pixel value is larger than the threshold value (step 802, YES), the focus pixel is regarded as a background pixel (step 805). When the pixel value is equal to or below the threshold (step 802, NO), the focus image is regarded as a feature point pixel, and its coordinate value is recorded as the vein image (step 803).

Next, whether or not there is any remaining unprocessed pixel is checked (step 804), and if there is a remaining unprocessed pixel (step 804, YES), the focus pixel is shifted to the next pixel (step 806), and the processes in and after step 802 are repeated. As the next pixel, for example, the right-hand neighboring pixel of the focus pixel or the leftmost pixel of the line one level below is used, but the next pixel is not limited to these pixels. Then, when there is no unprocessed pixel any more (step 804, NO), the process is terminated.

As the threshold in step 802, a smaller value than an average background pixel value is used, and the value is determined according to the intensity of the light of the irradiating unit 411 and the sensitivity of the image capturing unit 412. For example, when the range of the pixel value is 0 to 255, one of the values 50 through 200 is used as the threshold, and preferably, 150 is used as the threshold.

Figure 9:
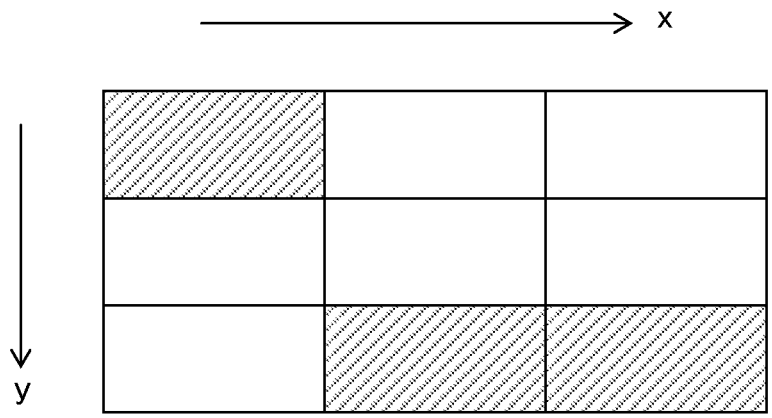
FIG. 9 is illustration of a captured image.

FIG. 9 illustrates an example of a captured image. In this example, for the sake of simplicity, an image composed of nine pixels of three in the horizontal direction and three in the vertical direction is used, but in practice, an image composed of more pixels is used. Regarding the horizontal axis as the x axis and the vertical axis as the y axis, the position of each pixel may be represented as a coordinate value (x,y).

Here, when dark pixels exist at the positions of (1,1), (2,3) and (3,3), these three pixels are regarded as the featured pixel, and a vein image as illustrated in FIG. 10 is obtained. The feature point number in FIG. 10 is identification information of the feature point pixel, and the coordinate value represents the position of the feature point pixel. The coordinate values of the feature point numbers 1, 2, and 3 are, (1,1), (2,3) and (3,3), respectively.

Not only in personal authentication using veins, but in personal authentication using biological information, extracted biological information often consists of a plurality of feature points having an integer coordinate value. Therefore, the feature extraction process in FIG. 8 may be applied to such personal authentication without change. In addition, other than the feature extraction process in FIG. 8, it is also possible to use various feature extraction processes.

The correcting unit 414 performs the position alignment process to correct the vein image of collation data. As the position alignment process, for example, there are following two types.

(1) A process to calculate the collation distance for various position correction amounts In this case, the configuration is made so that a process to correct the vein image at the time of authentication by a position correction amount and after that, to transform the corrected vein image and calculate the collation distance is repeated. As the final collation distance, for example, the minimum value of the calculated collation distances is used.

The correction unit 414 generates various position correction amounts, and generates a corrected vein image corresponding to each position correction amount. For example, when parallel shift in units of one pixel is used as the position correction amount, the combination of the parallel shift amounts of respective pixels is used as the position correction amount.

(2) A process to calculate the position correction amount based on information extracted from registered data and collation data The process in this case is categorized into a case in which it is impossible to identify an individual by extracted information, and a case in which it is possible to identify an individual by extracted information. For example, it is impossible to identify an individual by information such as the coordinate value of one feature point, the coordinate value of the center of gravity of all feature points, but it is possible to identify an individual by using information such as the combination of the coordinate values of all feature points.

When it is impossible to identify an individual, the position correction amount may be calculated by an easy method. For example, from the coordinate values of a certain feature point at the time of registration and at the time of authentication, the difference vector of the two may be obtained, and may be used as the parallel shift amount.

Hereinafter, in a case of calculating the position correction amount based on information with which an individual may be identified, a method to calculate the position correction amount while protecting the information is explained.

In this case, as illustrated in FIG. 11, a correction supporting unit 1101 is added in the server 501 in FIG. 5. The correction supporting unit 1101 corresponds to the generating unit 321 in FIG. 3. The correcting unit 414 of the client 401 calculates the position correction amount by exchanging information with the correction supporting unit 1101. This method appears to be similar to the challenge response-type password authentication, but the password authentication judges the strict match of the character string, whereas in this method, a special process to calculate the position correction amount is performed.

First, a case in which the correspondence relationship of feature point pixels between registered data and collation data is known, and affine transformation to align the position of the feature point pixel of collation data to the position of the feature point pixel of registered data is used as the position alignment process is explained. For determining the parameter of affine transformation, the least-square method is used.

Figure 12:
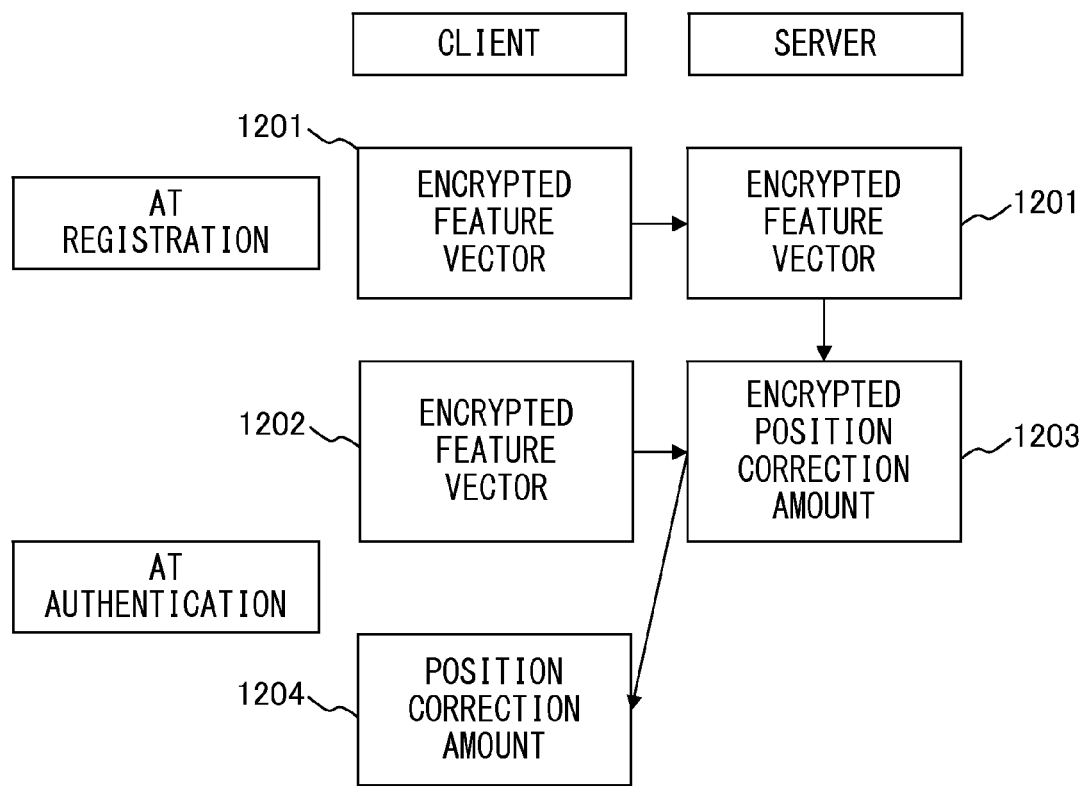
FIG. 12 is a diagram illustrating a position correction amount calculation process.

FIG. 12 illustrates an example of the position correction amount calculation process as described above. At the time of registration, the correction unit 414 encrypts the feature vector indicating the position of the feature point pixel of the vein image, and the communication unit 418 transmits the encrypted feature vector to the server 501. Then, the communication unit 511 forwards the encrypted feature vector 1201 to the registration unit 512, and the registration unit 512 stores the encrypted feature vector 1201 in the storing unit 513.

FIG. 13 is a flowchart of a process performed by the client 401 in FIG. 4 at the time of authentication, and FIG. 14 is a flowchart of a process performed by a server 501 in FIG. 11 at the time of authentication.

At the time of authentication, the correction unit 414 of the client 401 encrypts the feature vector indicating the position of the feature point pixel of the vein image (step 1301), and the communication unit 418 transmits an encrypted feature vector 1202 to the server 501 (step 1302).

The communication unit 511 of the server 501 receives the encrypted feature vector 1202, and forwards it to the correction supporting unit 1101 (step 1401). The correction supporting unit 1101 calculates an encrypted position correction amount 1203 using the encrypted feature vectors 1201 and 1202 (step 1402). Then, the communication unit 511 transmits the encrypted position correction amount 1203 to the client 401 (step 1403)

The communication unit 418 of the client 401 receives the encrypted position correction amount 1203 (step 1303), and the correction unit 414 decrypts the encrypted position correction amount 1203 and obtains a position correction amount 1204 (step 1304).

The correction unit 414 encrypts the feature vector using a random matrix of which elements are random numbers, and the correction supporting unit 1101 calculates the encrypted position correction amount 1203 by a prescribed arithmetic operation using the encrypted feature vectors 1201 and 1202. Then, the correcting unit 414 decrypts the encrypted position correction amount 1203, using the characteristics of the prescribed arithmetic operation performed by the correction supporting unit 1101.

According to the position correction amount calculation process as described above, since the correction supporting unit 1101 performs the arithmetic operation using the encrypted feature vectors 1201 and 1202, there is no leakage from the server 501 of the value of the feature vector being feature information of the vein image. Furthermore, since the arithmetic operation result is the encrypted position correction amount 1203, there is no leakage from the value of the position correction amount 1204 from the server 501 either. Therefore, the position correction amount 1204 may be calculated at the client 401 while protecting biological information of the user.

Hereinafter, a specific example of the position correction amount calculation process in FIG. 12 is explained. the coordinate value $f'_i$ of the i-th feature point pixel in registered data and the coordinate value $f_i$ of the i-th feature point pixel in collation data may be described as follows.

$$f'_i = (x'_i, y'_i)^T \ (i=1, \ldots, n) \tag{1}$$

$$f_i = (x'_i, y'_i)^T \ (i=1, \ldots, n) \tag{2}$$

Here, i represents the feature point number, n represents the number of feature point pixels, "T" represents transposition of the matrix or vector. Feature point pixels corresponding between registered data and collation data are assigned to the same number. Affine transformation to correct $f_i$ and conform to $f'_i$ may be described as follows.

$$f'_i = Af_i + b \tag{3}$$

A and b respectively represent the coefficient matrix and the coefficient vector of affine transformation, and correspond to the position correction amount 1204 in FIG. 12. To determine A and b, the least-square method is used, and A and b that makes the evaluation function J below minimum are obtained.

$$J = \sum_{i=1}^{n} \|f'_i - (Af_i + b)\|^2 \tag{4}$$

Here, $\|\cdot\|$ represents the norm of the vector. Using the coordinate value $\bar{f}'$ of the center of gravity of $f'_1$-$f'_n$ and the coordinate value $\bar{f}$ of the center of gravity of $f_1$-$f_n$, b is expressed as follows.

$$b = \bar{f}' - A\bar{f} \tag{5}$$

Therefore, by obtaining A only, b may be obtained by expression (5). Substituting b of expression (5) into the right side member of expression (4), the following expression is obtained.

$$J = \sum_{i=1}^{n} \|(f'_i - \bar{f}') - A(f_i - \bar{f})\|^2 \tag{6}$$

Here, by subtracting the coordinate value of each center of gravity from $f'_i$ and $f_i$, $f'_i$ and $f_i$ are redefined.

$$f'_i = f'_i - \bar{f}' \tag{7}$$

$$f_i = f_i - \bar{f} \tag{8}$$

Accordingly, expression (6) is changed as follows.

$$J = \sum_{i=1}^{n} \|f'_i - Af_i\|^2 \tag{9}$$

Then, A may be obtained as the solution of the following linear equation.

$$AM = B \tag{10}$$

Here, the matrix M and B is described as follows using $x'_1$-$x'_n$, $y'_1$-$y'_n$, $x_1$-$x_n$, and $y_1$-$y_n$.

$$M = \begin{pmatrix} \sum_{i=1}^{n} x_i^2 & \sum_{i=1}^{n} x_i y_i \\ \sum_{i=1}^{n} x_i y_i & \sum_{i=1}^{n} y_i^2 \end{pmatrix} \tag{11}$$

$$B = \begin{pmatrix} \sum_{i=1}^{n} x_i x'_i & \sum_{i=1}^{n} y_i x'_i \\ \sum_{i=1}^{n} x_i y'_i & \sum_{i=1}^{n} y_i y'_i \end{pmatrix} \tag{12}$$

M of expression (11) represents a moment matrix of which elements are the sum of products of $x_1$-$x_n$ and $y_1$-$y_n$.

When biological information is not to be protected, M and B are calculated directly using $f'_i$ and $f_i$, and using the inverse matrix $M^{-1}$ of M, A may be calculated from the following expression.

$$A = BM^{-1} \tag{13}$$

However, to calculate the position correction amount safely while protecting biological information, this method is not preferable. Therefore, a method as described below is used.

First, at the time of registration, the correcting unit 414 divides the coordinate value of the feature point pixel into the x coordinate and the y coordinate, and generates a feature vector $(x'_1, \ldots, x'_n)^T$ consisting of n pieces of x coordinate values, and a feature vector $(y'_1, \ldots, y'_n)^T$ consisting of n pieces of y coordinate values. Then, using an n-dimensional random orthogonal matrix $R_1$, by matrix operation as follows, the two feature vectors are encrypted.

$$u = R_1(x'_1, \ldots, x'_n)^T \tag{14}$$

$$v = R_1(y'_1, \ldots, y'_n)^T \tag{15}$$

u and v correspond to the encrypted feature vector 1201 in FIG. 12, and are transmitted from the client 401 to the server 501, and stored in the storing unit 513. $R_1$ is stored in the storing unit 416 of the client 401. The random orthogonal matrix $R_1$ may be generated, for example, in the method below.

1. Set random numbers for all elements of the matrix.
2. By Gram-Schmidt orthogonalization, perform orthogonalization of the matrix. Accordingly, the matrix is modified so that the size of column vector is 1, and, any two column vectors are orthogonal.

At the time of authentication, the correcting unit 414 calculates M from $x_1$-$x_n$ and $y_1$-$y_2$, and using the random two-dimensional non-singular matrix $R_2$, encrypts M by matrix operation as follows.

$$M' = R_2 M \tag{16}$$

As the random non-singular matrix $R_2$, for example, a random orthogonal matrix may be used. Meanwhile, the correcting unit 414 divides the coordinate value of the feature point pixel into the x coordinate and the y coordinate, and generates a feature vector $(x_1, \ldots, x_n)^T$ consisting of n pieces of x coordinate values and a feature vector $(y_1, \ldots,$ $y_n)^T$ consisting of n pieces of y coordinate values. Then, using $R_1$, by matrix operation as follows, the two feature vectors are encrypted.

$$s = R_1(x_1, \ldots, x_n)^T \tag{17}$$

$$t = R_1(y_1, \ldots, y_n)^T \tag{18}$$

s and t correspond to the encrypted feature vector 1202 in FIG. 12, and are transmitted with the encrypted moment matrix M' from the client 401 to the server 501.

The correction supporting unit 1101 calculates B by the following expression using u and v stored in the storing unit 513, and received s and t.

$$B = \begin{pmatrix} s^T u & t^T u \\ s^T v & t^T v \end{pmatrix} \tag{19}$$

Then, using obtained B and M', matrix A' that satisfies the linear equation as follows is obtained.

$$A'M' = B \tag{20}$$

A' corresponds to the encrypted position correction amount 1203 in FIG. 12, and is transmitted from the server 501 to the client 401. Assuming the inverse matrix of $R_2$ as $R_2^{-1}$, the following relational expression is established.

$$A' = AR_2^{-1} \tag{21}$$

Then, the correcting unit 414 calculates A by the following expression.

$$A = A'R_2 \tag{22}$$

When A is obtained, b may be calculated, by expression (5), based on the coordinate value of the center of gravity being information that does not identify an individual.

While the client 401 uses the random values $R_1$ and $R_2$ to encrypt the feature vector and the matrix M in the specific embodiment above, instead of the random matrix, another matrix that is not known by the server 501 may also be used. In addition, other than affine transformation, another transformation that is reasonable physically and optically may also be used for the position alignment process.

Next, the position correction amount calculation process in a case in which the correspondence relationship of feature point pixels between registered data and collation data is unknown is explained. In this case, the position correction amount may be calculated after performing preprocessing to associate closest feature point pixels. Since the position correction amount may be calculated applying the process illustrated in FIG. 13 and FIG. 14 when the correspondence relationship of feature point pixels are obtained, hereinafter, the preprocessing is mainly explained.

FIG. 15 illustrates an example of such preprocessing. At the time of registration, the correcting unit 414 generates a feature point number image in which a feature point number of the closest feature point pixel to each pixel included in the vein image is set as a pixel value of the pixel, and encrypts the feature point number image. The communication unit 418 transmits an encrypted feature point number image 1501 to the server 501. Then, the communication unit 511 transfers the encrypted feature point number image 1501 to the registration unit 512, and the registration unit 512 stores the encrypted feature point number image in the storing unit 513.

Figure 17:
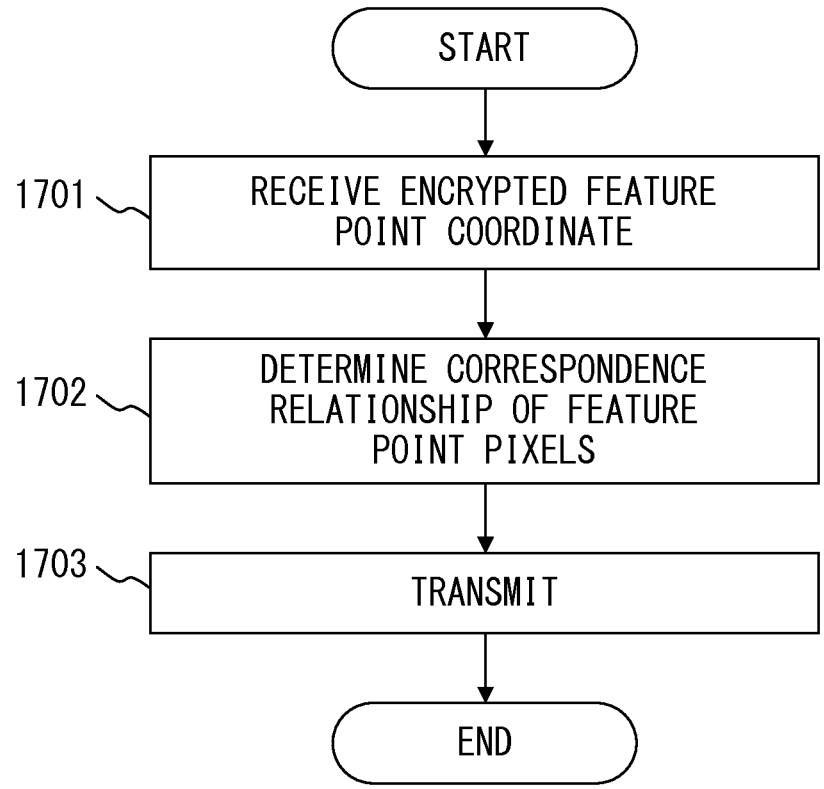
FIG. 17 is a flowchart of a preprocessing performed by a server at the time of authentication.

FIG. 16 is a flowchart of a process performed by the client 401 in FIG. 4 at the time of authentication, and FIG. 17 is a flowchart of a process performed by the server 501 in FIG. 11 at the time of authentication.

At the time of authentication, the correcting unit 414 of the client 401 encrypts the coordinate value (feature point coordinate) (step 1601), the communication unit 418 transmits an encrypted feature point coordinate 1502 to the server 501 (step 1602).

The communication unit 511 of the server 501 receives the encrypted feature point coordinate 1502, and forwards it to the correction supporting unit 1101 (step 1701). The correction supporting unit 1101 determines a correspondence relationship 1503 of feature point pixels between registered data and collation data, using the encrypted feature point number image 1501 and the encrypted feature point coordinate 1502 (step 1702). Then, the communication unit 511 transmits the correspondence relationship 1503 of feature point pixels to the client 401 (step 1703).

The communication unit 418 of the client 401 receives the correspondence relationship 1503 of feature point pixels (step 1603), and the correcting unit 414 associates each feature point number of collation data to each feature point number of registered data, based on the correspondence relationship 1503 of feature point pixels (step 1604).

The correcting unit 414 encrypts, for example, the feature point number image and the feature point coordinate using random permutation. Random permutation may be generated by generating random numbers within the range of 1 to m in order assuming the total number of pixels of the image as m, and by recording the order. However, overlapped numerical values are excluded.

The correction supporting unit 1101 obtains the correspondence relationship of feature point pixels by, for example, converting the coordinate value of each feature point number included in the encrypted feature point coordinate 1502 into a feature point number using the encrypted feature point number image 1501.

By such preprocessing, since the correction supporting unit 1101 performs the process using the encrypted feature point number image 1501 and the encrypted feature point coordinate 1502, there is no leakage of the coordinate value of each feature point pixel from the server 501. Therefore, while protecting the biological information of the user, the correspondence relationship 1503 of the feature point pixels may be determined at the server 501.

Hereinafter, a specific example of the preprocessing in FIG. 15 is explained. When the vein image as illustrated in FIG. 9 and FIG. 10 is obtained at the time of registration, the correcting unit 414 determines the feature point number of the closest feature point image to each pixel of the captured image. When a plurality of closest feature points to one pixel exist, one feature point pixel is selected according to the ascending order of the feature point number, an order determined using random numbers, and the like.

In the image in FIG. 9, since the closest feature point pixel to the coordinate value (1,1) is the pixel itself, and the feature point number is "1". Since the closest feature point pixel to the coordinate value (2,2) is the pixel of the coordinate value (2,3), the feature point number is "2". The closest feature point pixel to the pixel of the coordinate value (3,1) is the pixel of the coordinate value (1,1) and the pixel of the coordinate value (3,3). In this case, for example, according to the ascending order of the feature point number, the pixel of the coordinate value (1,1) is selected, and the feature point number is "1".

Figure 18:
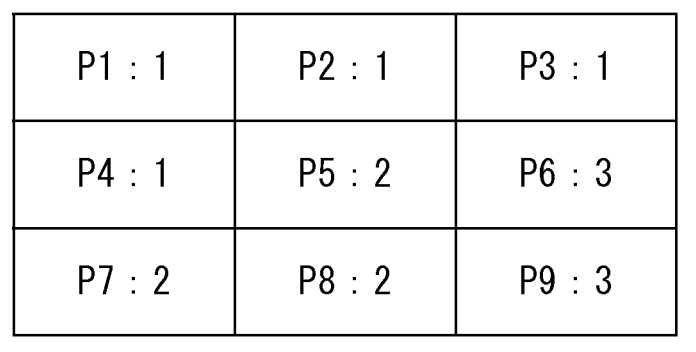

As described above, the correcting unit 414 generates a feature point number image as illustrated in FIG. 18. In the feature point number image in FIG. 18, in order to make the explanation of permutation easily understood, a name such as P1 is assigned to each pixel.

Next, the correcting unit 414 rearranges each pixel of the feature point number image by random permutation as illustrated in FIG. 19. The permutation in FIG. 19 represents an operation to replace each pixel descried on the upper level with each pixel described on the lower level.

By the permutation in FIG. 19, pixel P1 of the feature point number image in FIG. 18 is replaced with pixel P9, and pixel P2 is replaced with P1. In this way, the feature point number image in FIG. 18 is transformed into an image as in FIG. 20. The image in FIG. 20 corresponds to the encrypted feature point number image 1501 in FIG. 15, and is transmitted from the client 401 to the server 501.

When the same vein image as the vein image illustrated in FIG. 9 and FIG. 10 is obtained at the time of authentication, the correcting unit 414 changes the coordinate value of each feature point pixel according to the permutation in FIG. 19, and generates the feature point coordinate as in FIG. 21.

The feature point pixel of the feature point number "1" in FIG. 10 corresponds to pixel P1, and since pixel P1 moves to the position of pixel P2 by the permutation in FIG. 19, its coordinate value is changed from (1,1) to (2,1). In the same manner, the feature point pixel of the feature point number "2" corresponds to pixel P8, and since pixel P8 moves to the position of pixel P7, the coordinate value is changed from (2,3) to (1,3). The feature point pixel of the feature point number "3" corresponds to pixel P9, and since pixel P9 moves to the position of P1, its coordinate value is changed from (3,3) to (1,1).

The feature point coordinate in FIG. 21 obtained as described above corresponds to the encrypted feature point coordinate 1502 in FIG. 15, and is transmitted from the client 401 to the server 501.

Figure 20:
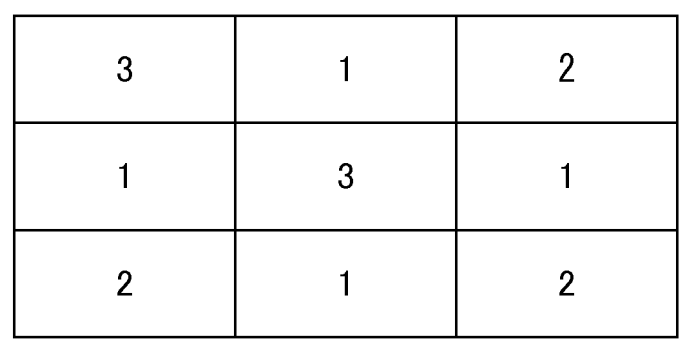

In FIG. 20, since the pixel value of the pixel corresponding to the coordinate value (2,1) of the feature point number "1" is "1", the feature point number "1" of collation data is associated with the feature point number "1" of registered data. In the same manner, since the pixel value of the pixel corresponding to the coordinate value (1,3) of the feature point number "2" is "2", the feature point number "2" of collation data is associated with the feature point number "2" of registered data. Since the pixel value of the pixel corresponding to the coordinate value (1,1) of the feature point number "3" is "3", the feature point number "3" of collation data is associated with the feature point number "3" of registered data.

As described above, the correspondence relationship of feature point pixels as illustrated in FIG. 22 is obtained, and transmitted from the server 501 to the client 401. Then, the correcting unit 414 calculates the position correction amount by the process illustrated in FIG. 13, after associating each feature point number of collation data with each feature point number of registered data, based on the received correspondence relationship of feature point pixels.

In the specific example explained above, the coordinate values of the feature point pixels associated between registered data and collation data are the same. Therefore, it is understood that the correspondence relationship in FIG. 22 represents the best association. In this case, as the position alignment process, identical transformation that does not perform shift of the feature point pixel is best, and the coefficient matrix A of identical transformation may be obtained by the calculations in expressions (1)-(22). Alternatively, by calculating the parallel shift amount from the difference vector indicating the difference of the coordinate values of the center of gravity in registered data and collation data, identical transformation with the parallel shift amount being 0 may also be obtained.

When a vein image as in FIG. 23 that is different from registered data is obtained at the time of authentication, the feature point pixel of the feature point number "1" correspond to pixel P4, and since pixel P4 moves to the position of pixel P8 by the permutation in FIG. 19, its coordinate value is changed from (1,2) to (2,3). In the same manner, the feature point pixel of the feature point number "2" corresponds to pixel P5, and since pixel P5 moves to the position of pixel P3, its coordinate value is changed from (2,2) to (3,1). The feature point pixel of the feature point number "3" corresponds to pixel P6, and since pixel P6 moves to the position of pixel P5, its coordinate value is changed from (3,2) to (2,2). In this way, a feature point coordinate as in FIG. 24 is generated.

Then, in FIG. 20, since the pixel value of the pixel corresponding to the coordinate value (2,3) of the feature point number "1" in FIG. 24 is "1", the feature point number "1" of collation data is associated with the feature point number "1" of registered data. In the same manner, since the pixel value of the pixel corresponding to the coordinate value (3,1) of the feature point number "2" is "2", the feature point number "2" in collation data is associated with the feature point number "2" of registered data. Since the pixel value corresponding to the coordinate value (2,2) of the feature point number "3" is "3", the feature point number "3" of collation data is associated with the feature point number "3" of registered data. In this way, the same correspondence relationship of feature point pixels as FIG. 22 is obtained.

While the client 401 uses random permutation to encrypt the feature point number image and the feature point coordinate in the specific example above, instead of random permutation, another permutation that is not known by the server 501 may also be used.

Next, an example of the transformation process performed by the transforming unit 415 in FIG. 4 is explained. At the time of registration, the transforming unit 415 assigns a pixel value to each pixel, based on a measure indicating how close each pixel included in the captured image is to the feature point pixel. For example, the pixel value "0" may be assigned to the pixel of which distance from the feature point pixel is within a certain range, and the pixel value "1" may be assigned to other pixels. Accordingly, a certain range may be given to the feature point pixel, and the collation accuracy of registered data and collation data may be increased.

The transforming unit 415 rearranges each pixel of the image described as described above by random permutation, and generates a transformed vein image. The transformed vein image is transmitted from the client 401 to the server 501 as registered data.

Figure 25:
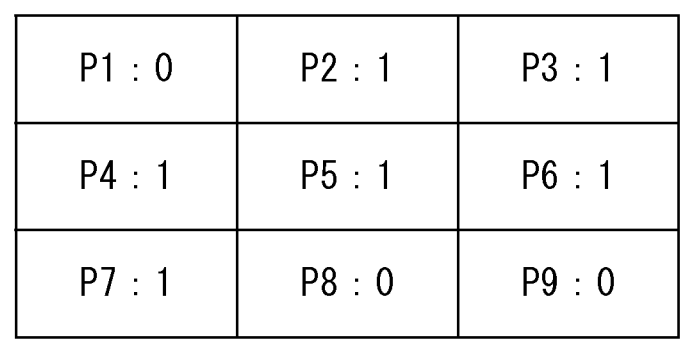
Figure 26:
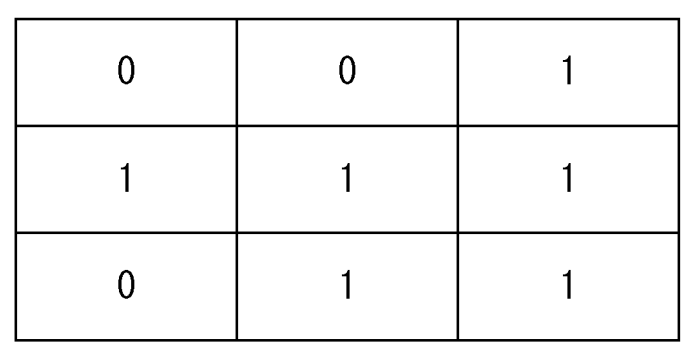

For example, when transforming the vein image in FIG. 10, by assigning the pixel value "0" to the pixel of which distance from each feature point pixel is "0", and by assigning the pixel value "1" to other pixels, an image as in FIG. 25 is generated. By rearranging each pixel of the image in FIG. 25 by the permutation in FIG. 19, the transformed vein image as in FIG. 26 is generated.

At the time of authentication, the transforming unit 415 changes the pixel value of each feature point pixel of the vain image using the permutation used in the transformation process for the registered data, to generate a transformed vein image. The transformed vein image is transmitted from the client 401 to the server 501 as collation data.

For example, when the vein image in FIG. 10 is transformed by the permutation in FIG. 19, a transformed vein image as in FIG. 21 is generated. When the vein image in FIG. 23 is transformed by the permutation in FIG. 19, a transformed vein image as in FIG. 24 is generated.

In the specific embodiment above, the client 401 uses random permutation to transform the vein image, but instead of random permutation, another permutation that is not known by the server 501 may also be used.

Next, an example of the collation distance calculation process performed by the collation distance calculation unit 514 in FIG. 5 and FIG. 11 is explained. The collation distance calculating unit 514 calculates the collation distance between the transformed vein image stored in the storing unit 513 as registered data, and the transformed vein image being collation data received from the client 401 at the time of authentication. As the collation distance, for example, the sum of the differences in distance based on the measure described above between the closest feature point pixels is used.

When a transformed vein image as in FIG. 26 is stored as registered data, in the image in FIG. 26, the sum of the pixel values of the pixels corresponding to the coordinate values of the respective feature point numbers of collation data is calculated as the collation distance.

The collation distance calculating unit 514 first repeats a process to set 0 in a variable S that holds the sum and to add the pixel value corresponding to each coordinate value of collation data to S. Then, when the process is completed for all coordinate values of collation data, the value of S is output as the collation distance.

For example when collation data as in FIG. 21 is received, since the pixel values corresponding to the coordinate values (2,1), (1,3) and (1,1) are all 0 in the image in FIG. 26, 0 is output as the collation distance. Meanwhile, when collation data as in FIG. 24 is received, since the pixel values corresponding to the coordinate values (2,3), (3,1) and (2,2) are all 1 in the image in FIG. 26, 3 is output as the collation distance.

According to the collation distance calculation process as described above, the collation distance may be calculated efficiently with an operation amount in proportion to the number of feature point pixels.

Next, data stored in the storing unit 416 in FIG. 4 and the storing unit 513 in FIG. 5 and FIG. 11 is explained.

The storing unit 416 stores the transformation parameter used for the transformation process. For example, when the permutation in FIG. 19 is used for the transformation process, information indicating this permutation is stored as transformation parameter. It is also possible to use a different transformation parameter for each user ID. When the correcting unit 414 performs encryption of the feature vector, matrix M, feature point number image and the feature point coordinate, the parameter used for encryption of such information is also stored in the storing unit 416.

The storing unit 513 associates and stores the user ID with the transformed vein image. For example, when the transformed vein image is represented with binary pixel values, the storing unit 513 is implemented in the server 501 as a database in a format as in FIG. 27. In this case, the vein image is stored while being transformed into a string of numeric values (pixel values) according to a certain rule. When the correction supporting unit 1101 determines the encrypted position correction amount 1203 and the correspondence relationship 1503 of feature point pixels, the encrypted feature vector 1201 and the encrypted feature point number image 1501 are also stored in the storing unit 513.

According to the personal authentication system explained above, biological information may be protected without degrading the authentication accuracy.

Compared with the existing technique to encrypt biological information, it may be said that, since decryption is not performed at the time of authentication, the concern of leakage of decrypted biological information is eliminated, increasing the safety. Compared with the technique to perform the collation process after transforming biological information, there is an advantage that, by performing the position alignment process before transformation, degradation of the authentication accuracy may be prevented.

Compared with the technique to use the error correction code technique, there is an advantage that, since there is no need to correct the variation of biological information, a simpler collation process may be applied, and degradation of the authentication accuracy may be prevented.

Compared with the secret calculation technique, there is an advantage that, since the collation distance may be calculated efficiently with an operation amount in proportion to the number of feature point pixels, without requiring an enormous amount of calculation, a personal authentication technique with a high practical utility is realized.

Compared with the technique to apply an independent transformation process for each feature point, there is an advantage that the association of feature points in registered data and collation data is easy, and degradation of the authentication accuracy may be prevented. Compared with the existing technique to detect the position correction amount and to correct the feature amount for authentication, the risk for biological information to be identified with the combination of the position correction amount and the collation distance as a clue is reduced.

Incidentally, in the personal authentication system described above, the server 501 performs the collation process, but instead of the server 501, it is also possible that a portable information processing apparatus such as the IC card and the like of the user performs the collation process.

Figure 28:
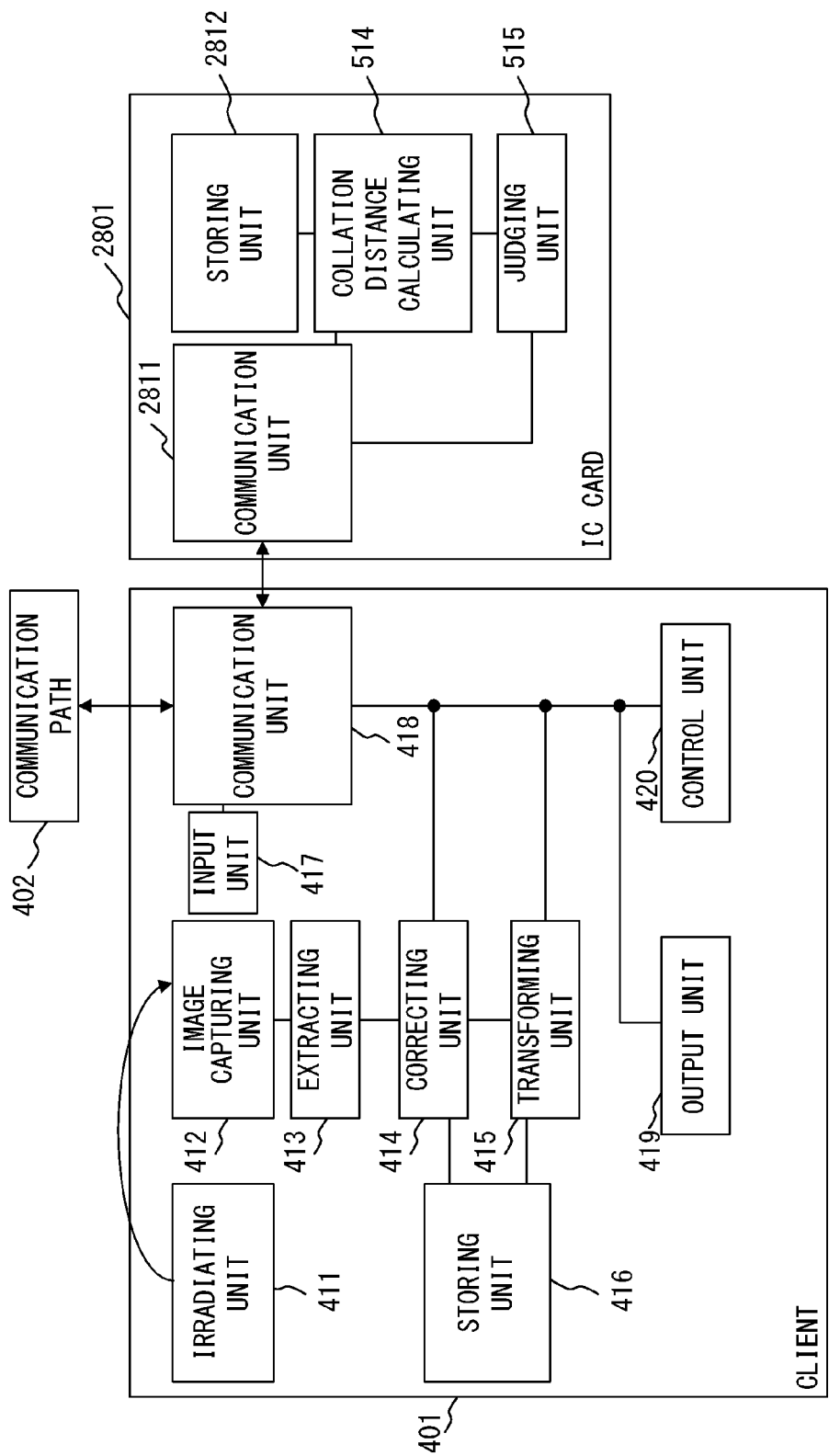
FIG. 28 is a configuration diagram (part 1) of a second personal authentication system.
Figure 29:
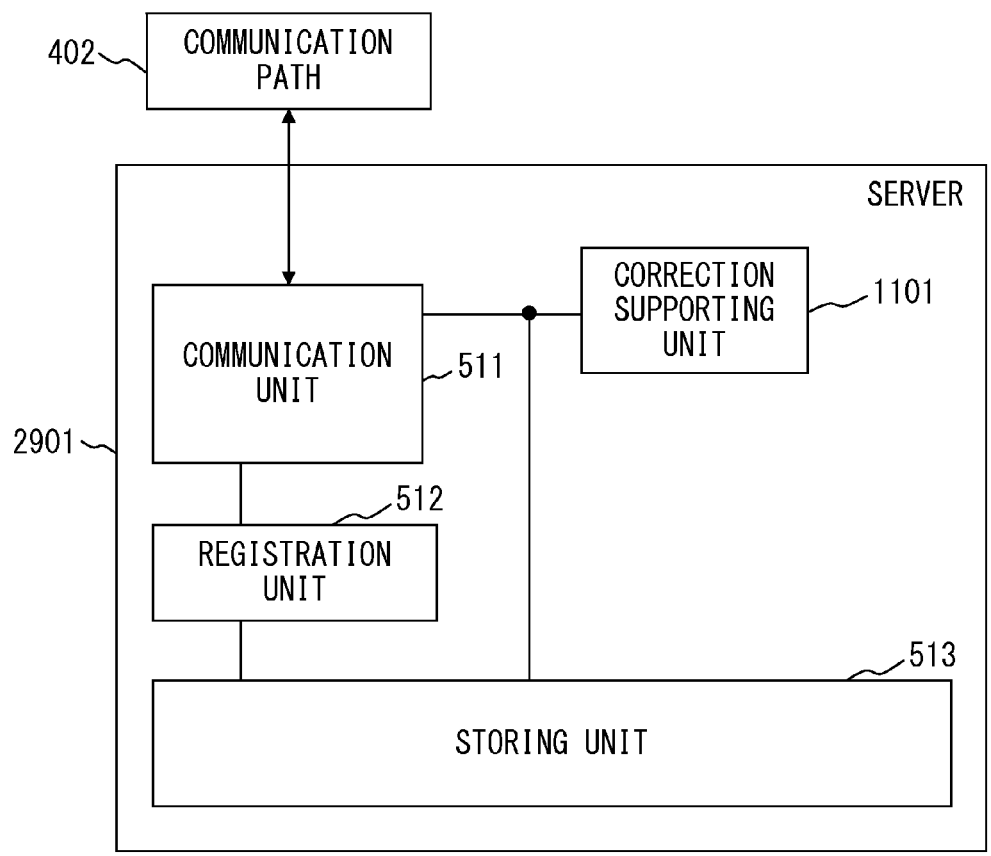
FIG. 29 is a configuration diagram (part 2) of a second personal authentication system.

FIG. 28 and FIG. 29 illustrates a configuration example of the personal authentication system like this. The personal authentication system includes a client 401 in FIG. 4, an IC card 2801, and a server 2901.

The IC card 2801 includes a communication unit 2811, a storing unit 2812, a collation distance calculating unit 514, and a judging unit 515. The communication unit 2811 communicates with the client 401, and the storing unit 2812 stores registered data. The operation of the collation distance calculating unit 514 and the judging unit 515 is the same as in the server 501 in FIG. 5 and FIG. 11.

The server 2901 includes a communication unit 511, a registration unit 512, a storing unit 513, and a correction supporting unit 1101. The operation of the communication unit 511, the registration unit 512, and the correction supporting unit 1101 is the same as in the server 501 in FIG. 11. The storing unit 513 stores the encrypted feature vector 1201, and the encrypted feature point number image 1501. The storing unit 513 may also store registered data.

The server 2901 operates, in the same manner as the server 501, a position correction supporting apparatus to support position alignment by the client 401, and the IC card 2801 performs the collation process of position-aligned collation data with registered data.

According to the personal authentication system as described above, by storing biological information used for the calculation of the collation distance in the IC card 2801 owned by the user and with which fraudulent reading out is difficult, the safety of biological information is increased. In addition, by providing the correction supporting unit 1101 with a relatively large calculation amount in the server 2901, personal authentication may be performed at a high speed using the IC card 2801 with less calculation capability. Instead of the IC card 2801, another portable information processing apparatus such as a mobile phone handset, a Personal Digital Assistant (PDA) and the like may also be used.

Meanwhile, it is also possible to use feature information extracted from biological information other than veins as registered data and collation data. For example, by capturing an image of another part of the human body such as the fingerprint, face, iris and like and obtaining the position of the feature point pixel, feature information is extracted.

Furthermore, the personal authentication system of the embodiment is applied to, other than the room-entrance management, various personal authentication using biological information, such as account transaction of a financial institute via Automated teller machine (ATM) and communication network, log-in to a computer, access to secret information and the like.

The biological information obtaining apparatus 301, the biological information collation apparatus 302 in FIG. 3, the client 401 in FIG. 4, the server 501 in FIG. 5, the IC card 2801 in FIG. 28, the server 2901 in FIG. 29 may be realized using an information processing apparatus (computer) as illustrated in FIG. 30, for example.

The information processing apparatus in FIG. 30 includes a Central Processing Unit (CPU) 3001, a memory 302, an input device 3003, an output device 3004, an external storage device 3005, a medium drive device 3006, and a network connection device 3007. These are connected to each other by a bus 3008.

The memory 3002 is, for example, a semiconductor memory such as a Read Only Memory (ROM), a Random Access Memory (RAM), a flash memory and the like, and stores a program and data used for the registration process or the authentication process. For example, the CPU 3001 performs the registration process or the authentication process by executing the program using the memory 3002. The memory 3002 may also be used as the storing unit 325 in FIG. 3, the storing unit 416 in FIG. 4, the storing unit 513 in FIG. 5, FIG. 11, FIG. 29, or the storing unit 2812 in FIG. 28.

The input device 3003 is, for example, a keyboard, a pointing device and the like, and is used for the input of an instruction and information from the user or the operator. The output device 3004 is, for example, a display device, a printer, a speaker and the like, and is used for the output of an enquiry and the processing result to the user and the operator. The input device 3003 may also be used as the input unit 417 in FIG. 4, and the output device 3004 may also be used as the output unit 419 in FIG. 4.

The external storage device 3005 is, for example, a magnetic disk device, an optical disk device, a magnetic optical disk device, a tape device and the like. A hard disk drive is also included in the external storage device 3005. The information processing apparatus may store the program and data in the external storage device 3005, and may load and use these onto the memory 3002.

The medium drive device 3006 drives a portable recording medium 3009, and accesses its recorded content. The portable recording medium 3009 is a memory device, a flexible disk, an optical disk, a magnetic optical disk and the like. A Compact Disk Read Only Memory (CD-ROM), a Digital Versatile Disk (DVD), a Universal Serial Bus (USB) memory and the like may also be included in the portable recording medium 3009. The user or the operator may store the program and data in the portable recording medium 3009, and may load and use them onto the memory 3002.

As described above, the computer-readable recording medium that stores the program and data used for the simulation process includes a physical (non-transitory) recording medium, such as a memory 3002, the external storage device 3005, and the portable recording medium 3009.

The network connection device 3007 is a communication interface connected to a communication network such as the communication path 402 and the like and performs data transformation accompanying the communication. The information processing apparatus may receive the program and data from an external device via the network connection device 3007, and may load and use these onto the memory 3002. The network connection device 3007 may also be used as the receiving unit 315, the transmitting unit 322, the receiving unit 323 in FIG. 3, the communication unit 418 in FIG. 4, the communication unit 511 in FIG. 5, FIG. 11, FIG. 29, or the communication unit 2811 in FIG. 28.

Meanwhile, when the information processing apparatus in FIG. 30 is the IC card 2801, the input device 3003, the output device 3004, and the external storage device 3005, and the medium drive device 3005 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process comprising:

obtaining biological information for authentication;

extracting first feature information from the biological information for authentication;

encrypting the first feature information;

transmitting encrypted first feature information to a biological information collating apparatus or a position correction supporting apparatus;

receiving encrypted position correction information from the biological information collating apparatus or the position correction supporting apparatus, wherein encrypted second feature information is generated by encrypting second feature information extracted from biological information for registration and the encrypted position correction information is generated by an arithmetic operation using the encrypted first feature information and the encrypted second feature information;

obtaining position correction information by decrypting the encrypted position correction information based on a characteristic of the arithmetic operation;

performing position alignment between the first feature information and the second feature information by correcting the first feature information based on obtained position correction information;

transforming corrected first feature information;

transmitting transformed first feature information to the biological information collating apparatus that stores transformed second feature information; and receiving a result of collation of the transformed first feature information with the transformed second feature information from the biological information collating apparatus.

2. The non-transitory computer-readable recording medium according to claim 1, wherein the obtaining the biological information for authentication obtains an image of a biological body as the biological information for authentication, the extracting the first feature information extracts a feature vector indicating a position of a plurality of feature point pixels included in the image as the first feature information, and the encrypting the first feature information encrypts the feature vector by using a random matrix.

3. The non-transitory computer-readable recording medium according to claim 1, wherein the obtaining the biological information for authentication obtains an image of a biological body as the biological information for authentication, the extracting the first feature information extracts a feature vector indicating a position of a plurality of feature point pixels included in the image as the first feature information, the correcting the first feature information corrects the feature vector, and the transforming the corrected first feature information transforms corrected feature vector by using transformation to permutate positions of a plurality of pixels included in the image.

4. A non-transitory computer-readable recording medium having stored therein a program for causing a computer to execute a process comprising:
  generating encrypted position correction information by an arithmetic operation using encrypted first feature information and encrypted second feature information, wherein the encrypted first feature information is generated by encrypting first feature information extracted from biological information for authentication and the encrypted second feature information is generated by encrypting second feature information extracted from biological information for registration;
  transmitting the encrypted position correction information to a biological information obtaining apparatus;
  in order to perform position alignment between the first feature information and the second feature information,
  receiving the first feature information transformed after being corrected based on position correction information obtained by decrypting the encrypted position correction information based on a characteristic of the arithmetic operation from the biological information obtaining apparatus;
  collating the transformed first feature information with transformed second feature information; and
  transmitting a collation result to the biological information obtaining apparatus.

5. The non-transitory computer readable recording medium according to claim 4, wherein the generating the encrypted position correction information receives the encrypted first feature information from the biological information obtaining apparatus.

6. The A biological information obtaining apparatus, comprising:
  a camera configured to obtain biological information for authentication;
  a processor configured to extract first feature information from the biological information for authentication, and to encrypt the first feature information; and
  a communication interface configured to transmit encrypted first feature information to the-a biological information collating apparatus or a position correction supporting apparatus, and to receive encrypted position correction information from the biological information collating apparatus or the position correction supporting apparatus, wherein encrypted second feature information is generated by encrypting second feature information extracted from biological information for registration and the encrypted position correction information is generated by an arithmetic using the encrypted first feature information and the encrypted second feature information.
  wherein:
  the processor obtains position correction information by decrypting the encrypted position correction information based on a characteristic of the arithmetic operation, performs position alignment between the first feature information and the second feature information by correcting the first feature information based on obtained position correction information, and transforms corrected first feature information: and
  the communication interface transmits transformed first feature information to the biological information collating apparatus that stores transformed second feature information, and receives a result of collation of the transformed first feature information with the transformed second feature information from the biological information collating apparatus.

7. The biological information obtaining apparatus according to claim 6, wherein:
  the camera obtains an image of a biological body as the biological information for authentication; and
  the processor extracts a feature vector indicating a position of a plurality of feature point pixels included in the image as the first feature information, and encrypts the feature vector by using a random matrix.

8. The biological information obtaining apparatus according to claim 6, wherein:
  the camera obtains an image of a biological body as the biological information for authentication; and
  the processor extracts a feature vector indicating a position of a plurality of feature point pixels included in the image as the first feature information, corrects the feature vector, and transforms corrected feature vector by using transformation to permutate positions of a plurality of pixels included in the image.

9. A biological information collating apparatus comprising:
  a processor configured to generate encrypted position correction information by an arithmetic operation using encrypted first feature information and encrypted second feature information, wherein the encrypted first feature information is generated by encrypting first feature information extracted from biological information for authentication and the encrypted second feature information is generated by encrypting second feature information extracted from biological information for registration;
  a communication interface configured to transmit the encrypted position correction information to a biological information obtaining apparatus, and to receive, in order to perform position alignment between the first feature information and the second feature information, the first feature information transformed after being corrected based on position correction information obtained by decrypting the encrypted position correction information based on a characteristic of the arithmetic operation from the biological information obtaining apparatus;
  and
  a memory configured to store transformed second feature information,
  wherein the processor collates the transformed first feature information with the transformed second feature information, and the communication interface transmits a collation result to the biological information obtaining apparatus.

10. The biological information collating apparatus according to claim 9, wherein:
the communication interface receives the encrypted first feature information from the biological information obtaining apparatus;
the memory stores the encrypted second feature information.

* * * * *